(12) United States Patent
Yabu

(10) Patent No.: US 10,616,613 B2
(45) Date of Patent: Apr. 7, 2020

(54) RECOGNITION DATA GENERATION DEVICE, IMAGE RECOGNITION DEVICE, AND RECOGNITION DATA GENERATION METHOD

(71) Applicant: Panasonic Intellectual Property Management Co., Ltd., Osaka (JP)

(72) Inventor: Hiroshi Yabu, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/301,444

(22) PCT Filed: Jul. 13, 2015

(86) PCT No.: PCT/JP2015/003527
§ 371 (c)(1),
(2) Date: Oct. 3, 2016

(87) PCT Pub. No.: WO2016/009637
PCT Pub. Date: Jan. 21, 2016

(65) Prior Publication Data
US 2017/0034542 A1 Feb. 2, 2017

(30) Foreign Application Priority Data
Jul. 17, 2014 (JP) .................... 2014-147176

(51) Int. Cl.
*H04N 21/234* (2011.01)
*G06K 9/00* (2006.01)
(Continued)

(52) U.S. Cl.
CPC ....... *H04N 21/234* (2013.01); *G06K 9/00711* (2013.01); *G06K 9/00744* (2013.01);
(Continued)

(58) Field of Classification Search
CPC .... H04N 21/234; H04N 21/235; H04N 21/44; H04N 21/44008; H04N 21/4722;
(Continued)

(56) References Cited

U.S. PATENT DOCUMENTS 7,712,123 B2   5/2010  Miyaoku et al.
8,199,221 B2   6/2012  Yoshizumi
(Continued)

FOREIGN PATENT DOCUMENTS

CN   102177726 A   9/2011
CN   102292726 A   12/2011
(Continued)

OTHER PUBLICATIONS

Non-Final Office Action issued in U.S. Appl. No. 14/787,721, dated Aug. 4, 2016.
(Continued)

*Primary Examiner* — Rong Le
(74) *Attorney, Agent, or Firm* — McDermott Will & Emery LLP

(57) ABSTRACT

A recognition data creation device includes an image acquirer and a data creator. The image acquirer acquires a plurality of image frames included in a frame sequence that composes video content. Based on an inter-frame change in an image in the plurality of image frames acquired by the image acquirer, the data creator creates recognition data representing the video content, the recognition data to be used as a fingerprint in recognition of the video content.

6 Claims, 21 Drawing Sheets

(51) Int. Cl.
*H04N 21/235* (2011.01)
*H04N 21/44* (2011.01)
*H04N 21/8358* (2011.01)
*H04N 21/4722* (2011.01)
*G06Q 30/00* (2012.01)
*H04N 21/81* (2011.01)
*H04N 21/845* (2011.01)

(52) U.S. Cl.
CPC ......... *G06K 9/00758* (2013.01); *G06Q 30/00* (2013.01); *H04N 21/235* (2013.01); *H04N 21/44* (2013.01); *H04N 21/44008* (2013.01); *H04N 21/4722* (2013.01); *H04N 21/812* (2013.01); *H04N 21/8133* (2013.01); *H04N 21/8358* (2013.01); *H04N 21/8453* (2013.01)

(58) Field of Classification Search
CPC ............. H04N 21/812; H04N 21/8133; H04N 21/8358; H04N 21/8453
See application file for complete search history.

(56) References Cited

U.S. PATENT DOCUMENTS

| | | |
|---|---|---|
| 8,254,720 B2 | 8/2012 | Matsuzaki |
| 8,421,921 B1 | 4/2013 | Woodall |
| 8,582,952 B2 | 11/2013 | Circlaeys et al. |
| 9,148,610 B2 | 9/2015 | Yabu |
| 9,456,237 B2 | 9/2016 | Oztaskent et al. |
| 9,626,798 B2 | 4/2017 | Zavesky |
| 2002/0001453 A1 | 1/2002 | Mizumura et al. |
| 2002/0097339 A1 | 7/2002 | Kwon |
| 2002/0126990 A1 | 9/2002 | Rasmussen et al. |
| 2002/0143902 A1 | 10/2002 | Chung et al. |
| 2003/0051252 A1 | 3/2003 | Miyaoku et al. |
| 2003/0084462 A1 | 5/2003 | Kubota et al. |
| 2003/0149983 A1 | 8/2003 | Markel |
| 2004/0165865 A1 | 8/2004 | Sec et al. |
| 2005/0071425 A1 | 3/2005 | Chung et al. |
| 2005/0172312 A1 | 8/2005 | Lienhart et al. |
| 2006/0187358 A1 | 8/2006 | Lienhart et al. |
| 2006/0200842 A1 | 9/2006 | Chapman et al. |
| 2007/0157242 A1 | 7/2007 | Cordray et al. |
| 2007/0233285 A1 | 10/2007 | Yamamoto |
| 2007/0261079 A1 | 11/2007 | Pack et al. |
| 2008/0181515 A1 | 7/2008 | Kondo |
| 2008/0310731 A1 | 12/2008 | Stojancic et al. |
| 2009/0006375 A1 | 1/2009 | Lax et al. |
| 2009/0034937 A1 | 2/2009 | Kusunoki et al. |
| 2009/0177758 A1 | 7/2009 | Banger et al. |
| 2009/0244372 A1 | 10/2009 | Petronelli et al. |
| 2009/0279738 A1 | 11/2009 | Sasaki |
| 2010/0067873 A1 | 3/2010 | Sasaki et al. |
| 2010/0259684 A1 | 10/2010 | Kambe |
| 2010/0318515 A1 | 12/2010 | Ramanathan et al. |
| 2011/0078202 A1 | 3/2011 | Kamibeppu |
| 2011/0129017 A1* | 6/2011 | Oami ............... G06F 17/30256 375/240.24 |
| 2011/0135283 A1 | 6/2011 | Poniatowki et al. |
| 2011/0137976 A1 | 6/2011 | Poniatowski et al. |
| 2011/0181693 A1 | 7/2011 | Lee et al. |
| 2011/0243474 A1 | 10/2011 | Ito |
| 2011/0246202 A1 | 10/2011 | McMillan et al. |
| 2011/0261257 A1 | 10/2011 | Terry et al. |
| 2012/0020568 A1 | 1/2012 | Kogane |
| 2012/0075421 A1 | 3/2012 | Tsukagoshi |
| 2012/0092248 A1 | 4/2012 | Prabhala |
| 2012/0128241 A1 | 5/2012 | Jung |
| 2012/0320091 A1 | 12/2012 | Rajaraman et al. |
| 2012/0321125 A1 | 12/2012 | Choi et al. |
| 2013/0042289 A1 | 2/2013 | Park |
| 2013/0047178 A1 | 2/2013 | Moon et al. |
| 2013/0054645 A1 | 2/2013 | Bhagavathy et al. |
| 2013/0094590 A1 | 4/2013 | Laksono et al. |
| 2013/0106999 A1 | 5/2013 | Newton et al. |
| 2013/0111514 A1 | 5/2013 | Slavin et al. |
| 2013/0129219 A1 | 5/2013 | Takenouchi et al. |
| 2013/0145395 A1 | 6/2013 | Jeong et al. |
| 2013/0167189 A1 | 6/2013 | Lucas |
| 2013/0198773 A1 | 8/2013 | Jentz et al. |
| 2013/0202150 A1 | 8/2013 | Sinha et al. |
| 2013/0205321 A1 | 8/2013 | Sinha et al. |
| 2013/0230292 A1 | 9/2013 | Pierce et al. |
| 2013/0246457 A1 | 9/2013 | Stojancic et al. |
| 2013/0247117 A1 | 9/2013 | Yamada et al. |
| 2013/0254802 A1 | 9/2013 | Lax et al. |
| 2013/0308818 A1 | 11/2013 | MacIntosh et al. |
| 2014/0007155 A1 | 1/2014 | Vemparala et al. |
| 2014/0082655 A1 | 3/2014 | Moon et al. |
| 2014/0123204 A1 | 5/2014 | Moon et al. |
| 2014/0229485 A1 | 8/2014 | Icho et al. |
| 2014/0230002 A1 | 8/2014 | Kitazato |
| 2015/0020094 A1 | 1/2015 | Moon et al. |
| 2015/0026718 A1 | 1/2015 | Seyller |
| 2015/0193451 A1* | 7/2015 | Rowe .................... H04N 5/445 348/571 |

FOREIGN PATENT DOCUMENTS

| | | |
|---|---|---|
| EP | 1286541 A1 | 2/2003 |
| EP | 1 954 041 A1 | 8/2008 |
| EP | 2 244 208 A2 | 10/2010 |
| EP | 2337345 A1 | 6/2011 |
| EP | 2760200 A1 | 7/2014 |
| EP | 2763427 A1 | 8/2014 |
| JP | H04-245552 A | 9/1992 |
| JP | H09-185720 A | 7/1997 |
| JP | 10-126721 | 5/1998 |
| JP | H10-214258 A | 8/1998 |
| JP | 2000-287189 A | 10/2000 |
| JP | 2000-293626 A | 10/2000 |
| JP | 2002-175311 | 6/2002 |
| JP | 2002-209204 A | 7/2002 |
| JP | 2002-232372 A | 8/2002 |
| JP | 2002-334010 A | 11/2002 |
| JP | 2004-007323 A | 1/2004 |
| JP | 2004-104368 A | 4/2004 |
| JP | 2004-303259 A | 10/2004 |
| JP | 2004-341940 A | 12/2004 |
| JP | 2005-167452 A | 6/2005 |
| JP | 2005-167894 A | 6/2005 |
| JP | 2005-347806 A | 12/2005 |
| JP | 2006-030244 A | 2/2006 |
| JP | 2006-303936 A | 11/2006 |
| JP | 2007-049515 A | 2/2007 |
| JP | 2007-134948 | 5/2007 |
| JP | 2008-040622 A | 2/2008 |
| JP | 2008-042259 A | 2/2008 |
| JP | 2008-116792 A | 5/2008 |
| JP | 2008-176396 A | 7/2008 |
| JP | 2008-187324 | 8/2008 |
| JP | 2009-088777 A | 4/2009 |
| JP | 2010-164901 A | 7/2010 |
| JP | 2010-271987 A | 12/2010 |
| JP | 2011-034323 A | 2/2011 |
| JP | 2011-059504 A | 3/2011 |
| JP | 2011-234343 A | 11/2011 |
| JP | 2012-055013 A | 3/2012 |
| JP | 2012-231383 A | 11/2012 |
| JP | 2013-038773 A | 2/2013 |
| JP | 2013-070268 A | 4/2013 |
| JP | 2013-125191 A | 6/2013 |
| JP | 2013-164753 A | 8/2013 |
| WO | 2004/080073 A2 | 9/2004 |
| WO | 2007/039994 A1 | 4/2007 |
| WO | 2009/011030 A1 | 1/2009 |
| WO | 2010/022000 A2 | 2/2010 |
| WO | 2013/042531 A1 | 3/2013 |
| WO | 2013/047948 A1 | 4/2013 |
| WO | 2013/103273 A1 | 7/2013 |

(56) References Cited

FOREIGN PATENT DOCUMENTS

| WO | 2013/119082 A1 | 8/2013 |
|---|---|---|
| WO | 2014/0229485 A1 | 1/2014 |

OTHER PUBLICATIONS

Final Office Action issued in U.S. Appl. No. 14/787,721, dated Dec. 2, 2016.
Non-Final Office Action issued in U.S. Appl. No. 14/787,759, dated Dec. 29, 2016.
Non-Final Office Action issued in U.S. Appl. No. 14/888,444, dated Oct. 6, 2016.
Non-Final Office Action issued in U.S. Appl. No. 14/888,447, dated Sep. 6, 2016.
Final Office Action issued in U.S. Appl. No. 14/888,447, dated Jan. 10, 2017.
Non-Final Office Action issued in U.S. Appl. No. 14/888,449, dated Nov. 21, 2016.
Non-Final Office Action issued in U.S. Appl. No. 14/888,445, dated Aug. 12, 2016.
Non-Final Office Action issued in U.S. Appl. No. 14/890,121, dated Sep. 14, 2016.
The Extended European Search Report dated Jul. 5, 2016 for the related European Patent Application No. 14829140.4.
The Extended European Search Report dated Jun. 14, 2016 for the related European Patent Application No. 14832570.7 (with English translation).
The Extended Search Report dated Jul. 8, 2016 for the related Europena Patent Application No. 14838764.0.
The Extended European Search Report dated Jul. 19, 2016, for the related European Patent Application No. 14838765.7.
International Search Report of PCT application No. PCT/JP2014/003526 dated Oct. 7, 2014 (with English translation).
International Search Report of PCT application No. PCT/JP2014/003546 dated Oct. 7, 2014 (with English translation).
International Search Report issued in International Patent Application No. PCT/JP2014/003548, dated Oct. 7, 2014 with (English translation).
International Search Report of International Patent Application No. PCT/JP2014/003761, dated Oct. 21, 2014 (with English translation).
International Search Report of International Patent Application No. PCT/JP2014/003762, dated Oct. 21, 2014 (with English translation).
International Search Report of International Patent Application No. PCT/JP2014/003547, dated Oct. 7, 2014 (with English translation).
International Search Report of International Patent Application No. PCT/JP2014/003760, dated Oct. 7, 2014 (with English translation).
International Search Report of International Patent Application No. PCT/JP2015/004112, dated Oct. 27, 2015 (with English translation).
International Search Report of International Patent Application No. PCT/JP2015/004187, dated Oct. 20, 2015 (with English translation).

Gonzales R et al: "Digital Image Processing, Matching by correlation", Dec. 31, 2002 (Dec. 31, 2002), Digital Image Processing, Prentice-Hall Upper Saddle River, New Jersey, p. 701-704, XP002657364.
Template matching, Wikipedia, Mar. 11, 2013 (Mar. 11, 2013), XP002759268, Retrieved from the Internet: URL:https://en.wikipedia.org/w/index.php?title=Template_matching&oldid=543510371 [retrieved on-Jun. 28, 2016].
Notice of Allowance issued in U.S. Appl. No. 14/888,449, dated Nov. 24, 2017.
Notice of Allowance issued in U.S. Appl. No. 14/888,445, dated Nov. 20, 2017.
Notice of Allowance issued in U.S. Appl. No. 14/787,721, dated Dec. 18, 2017.
Non-Final Office Action issued in U.S. Appl. No. 15/302,460, dated Dec. 20, 2017.
Non-Final Office Action issued in related U.S. Appl. No. 13/958,863, dated Aug. 14, 2014.
Final Office Action issued in related U.S. Appl. No. 13/958,863, dated Jan. 23, 2015.
Final Office Action issued in U.S. Appl. No. 14/888,449, dated Mar. 6, 2017.
Final Office Action issued in U.S. Appl. No. 14/888,445, dated Jan. 30, 2017.
Final Office Action issued in U.S. Appl. No. 14/890,121, dated Mar. 13, 2017.
The Extended European Search Report dated Feb. 28, 2017 for the related European Patent Application No. 14841401.4.
The Extended European Search Report dated Mar. 3, 2017 for the related European Patent Application No. 14841377.6.
Non-Final Office Action issued in U.S. Appl. No. 14/787,721, dated Jun. 7, 2017.
Notice of Allowance issued in U.S. Appl. No. 14/787,759, dated May 9, 2017.
Final Office Action issued in U.S. Appl. No. 14/888,444, dated May 15, 2017.
Non-Final Office Action issued in U.S. Appl. No. 14/888,445, dated Jun. 9, 2017.
Notice of Allowance issued in U.S. Appl. No. 14/888,447, dated Jul. 3, 2017.
Non-Final Office Action issued in U.S. Appl. No. 14/888,449, dated Jul. 5, 2017.
The Extended European Search Report dated May 29, 2017 for the related European Patent Application No. 15832982.1.
The Extended European Search Report dated May 11, 2017 for the related European Patent Application No. 15822221.6.
International Search Report of PCT application No. PCT/JP2015/003527 dated Aug. 11, 2015.
Notice of Allowance issued in U.S. Appl. No. 14/888,444, dated Oct. 2, 2017.
Non-Final Office Action issued U.S. Appl. No. 14/890,121, dated Sep. 6, 2017.
Final Office Action issued in U.S. Appl. No. 14/890,121, dated Jan. 24, 2018.
English Translation of Chinese Search Report dated Jan. 18, 2019 for the related Chinese Patent Application No. 201580020543.2.
English Translation of Chinese Search Report dated Aug. 15, 2018 for the related Chinese Patent Application No. 201580020543.2.

\* cited by examiner

FIG. 18

Static fingerprint included in database: C00X

| 103 | 100 | 93 | 98 | 101 |
|---|---|---|---|---|
| 0 | 0 | 0 | 128 | 165 |
| 0 | 0 | 0 | 0 | 0 |
| 0 | 0 | 183 | 0 | 0 |
| 193 | 198 | 201 | 195 | 199 |

Static fingerprint included in recognition data: C002

| 103 | 100 | 93 | 98 | 101 |
|---|---|---|---|---|
| 129 | 135 | 0 | 128 | 0 |
| 0 | 0 | 0 | 0 | 0 |
| 0 | 0 | 0 | 0 | 0 |
| 193 | 198 | 201 | 195 | 199 |

Ratio of similar static region: 11/25 → similarity degree: 44%

FIG. 19

| Dynamic fingerprint included in database: D00X | | | | | | Dynamic fingerprint included in recognition data: D003 | | | | |
|---|---|---|---|---|---|---|---|---|---|---|
| -32 | -92 | 0 | 0 | 0 | | -88 | -127 | -94 | -41 | -32 |
| 0 | -52 | -32 | 0 | 0 | | 0 | -65 | -94 | -24 | 0 |
| 0 | 0 | 3 | 0 | 0 | | 0 | 0 | 0 | 0 | 0 |
| 0 | 0 | 35 | 0 | -23 | | 0 | 0 | 0 | 0 | -23 |
| 0 | 0 | 0 | 25 | 0 | | 24 | 20 | 0 | 0 | 0 |

Ratio of similar dynamic region: 5/25 → similarity degree: 20%

FIG. 20

|     | Recognition conditions |
| --- | --- |
| (a) | Similarity is established in at least one of static fingerprints and dynamic fingerprints |
| (b) | Similarity is established in at least two of static fingerprints and dynamic fingerprints |
| (c) | Similarity is established in at least one of static fingerprints, and similarity is established in at least one of dynamic fingerprints |
| (d) | Similarity is established continuously twice in static fingerprints or dynamic fingerprints |
| (e) | Similarity is established continuously three times in static fingerprints or dynamic fingerprints |

RECOGNITION DATA GENERATION DEVICE, IMAGE RECOGNITION DEVICE, AND RECOGNITION DATA GENERATION METHOD

TECHNICAL FIELD

The present disclosure relates to a recognition data creation device, an image recognition device and a recognition data creation method, which are for recognizing video content.

BACKGROUND ART

A communication service using a technology for recognizing content through a cloud is proposed. If this technology is used, then a television reception device (hereinafter, abbreviated as a "television") can be realized, which recognizes a video input thereto, acquires additional information related to this video via a communication network, and displays the acquired additional information on a display screen together with video content. A technology for recognizing the input video is called "ACR (Automatic Content Recognition)".

For the ACR, a fingerprint technology is sometimes used. Patent Literature 1 and Patent Literature 2 disclose the fingerprint technology. In this technology, an outline of a face or the like, which is reflected on an image frame in the video, is sensed, a fingerprint is created based on the sensed outline, and the created fingerprint is collated with data accumulated in a database.

CITATION LIST

Patent Literature

PTL 1: U.S. Patent Publication No. 2010/0318515
PTL 2: U.S. Patent Publication No. 2008/0310731

SUMMARY

The present disclosure provides a recognition data creation device, an image recognition device and a recognition data creation method, which can reduce processing relating to image recognition while enhancing accuracy of the image recognition.

A recognition data creation device in the present disclosure includes an image acquirer and a data creator. The image acquirer acquires a plurality of image frames included in a frame sequence that composes video content. Based on an inter-frame change in an image in the plurality of image frames acquired by the image acquirer, the data creator creates recognition data representing the video content, the recognition data to be used as a fingerprint in recognition of the video content.

An image recognition device in the present disclosure includes the above-mentioned recognition data creation device, an acquirer and a collator. The acquirer acquires a plurality of pieces of recognition data which represent respective pieces of video content. The collator collates the recognition data created in the data creator with the plurality of pieces of recognition data acquired by the acquirer.

A recognition data creation method in the present disclosure includes: an image acquisition step of acquiring a plurality of image frames included in a frame sequence that composes video content; and a creation step of creating recognition data representing the video content, based on an inter-frame change in an image in the plurality of acquired image frames, the recognition data to be used as a fingerprint in recognition of the video content.

The recognition data creation device in the present disclosure can reduce processing relating to image recognition while enhancing accuracy of the image recognition.

BRIEF DESCRIPTION OF DRAWINGS

FIG. 18 is a view schematically showing an example of processing for collating the static fingerprint in the first exemplary embodiment.

FIG. 19 is a view schematically showing an example of processing for collating the dynamic fingerprint in the first exemplary embodiment.

FIG. 20 is a view showing an example of recognition conditions for video content in the first exemplary embodiment.

DESCRIPTION OF EMBODIMENTS

Figure 1:
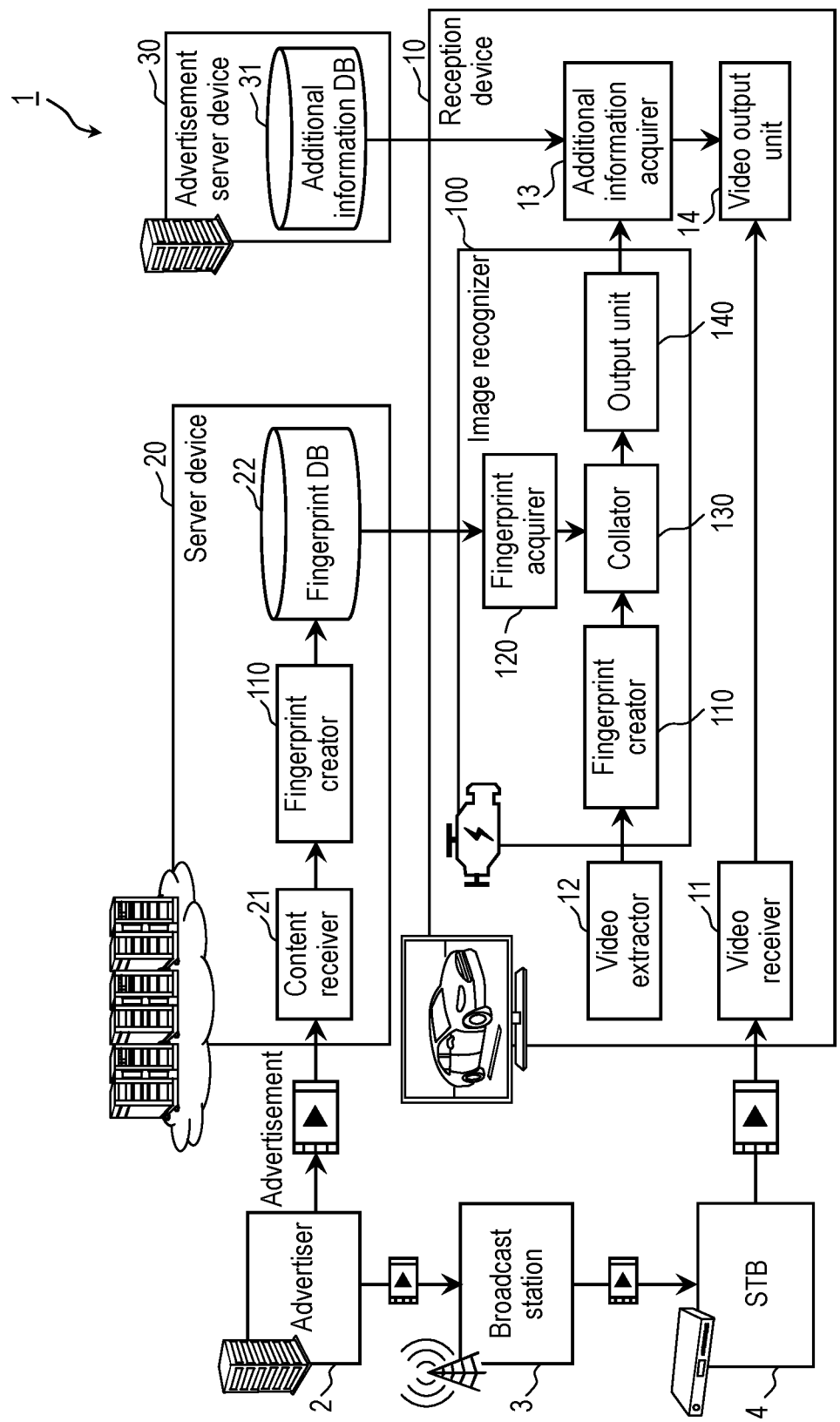
FIG. 1 is a block diagram showing a configuration example of a content recognition system in a first exemplary embodiment.

A description is made below in detail of exemplary embodiments while referring to the drawings as appropriate. However, a description more in detail than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

Moreover, the respective drawings are schematic views, and are not illustrated necessarily exactly. Furthermore, in the respective drawings, the same reference numerals are assigned to the same constituent elements.

First Exemplary Embodiment

[1-1. Content Recognition System]

First, a description is made of a content recognition system in this exemplary embodiment with reference to FIG. 1.

FIG. 1 is a block diagram showing a configuration example of content recognition system 1 in a first exemplary embodiment.

As shown in FIG. 1, content recognition system 1 includes: advertiser 2; broadcast station 3; STB (Set Top Box) 4; reception device 10; server device 20; and advertisement server device 30.

Advertiser 2 is a creation device configured to create advertisement video content (hereinafter, also referred to as "advertisement content") such as a commercial message (CM) or the like. Advertiser 2 transmits the advertisement content (referred to as an "advertisement" in FIG. 1) to broadcast station 3 and server device 20. Advertiser 2 transmits the advertisement content to broadcast station 3 and server device 20, for example, via communication network 105 such as the Internet or the like.

Broadcast station 3 is a transmission device configured to convert video content into a video signal to broadcast the video content as a television broadcast signal (hereinafter, also simply referred to as a "broadcast signal"). For example, the video content is broadcast content broadcasted by a wireless or wired broadcast or communication, and includes: program content such as a television program or the like; and advertisement video content (hereinafter, referred to as "advertisement content") such as a commercial message (CM) or the like. The program content and the advertisement content are switched from each other with the elapse of time.

STB 4 is a tuner/decoder configured to receive the broadcast signal, which is broadcasted from broadcast station 3, and to output the video signal or the like, which is based on the received broadcast signal. STB 4 receives a broadcast channel, which is selected based on an instruction from a user, from the broadcast signal broadcasted from broadcast station 3. Then, STB 4 decodes video content of the received broadcast channel, and outputs the decoded video content to reception device 10 via a communication path. Note that, for example, the communication path is HDMI (registered trademark) (High-Definition Multimedia Interface) or the like.

For example, reception device 10 is a video reception device such as a television set or the like. Reception device 10 is connected to server device 20 and advertisement server device 30 via communication network 105. Reception device 10 is configured to extract a plurality of image frames from a frame sequence of the received video content, and to perform image recognition for the extracted image frames. Reception device 10 acquires from server device 20 in advance a plurality of pieces of recognition data for use in the image recognition, and holds the same. Reception device 10 acquires additional information from advertisement server device 30 based on a result of the image recognition, and displays the acquired additional information on a display screen together with the video content in substantially real time.

Note that the image frames are pictures which compose the video content. Each of the image frames includes a frame in the progressive system, a field in the interlace system, and the like.

For example, server device 20 is a Web server. Server device 20 is configured to acquire the advertisement content transmitted from advertiser 2, to analyze acquired advertisement content, and to thereby create recognition data corresponding to the advertisement content. The recognition data is data (hash value) representing the advertisement content, and is data for use as a fingerprint in recognition of the advertisement content. Specifically, the recognition data is a fingerprint created based on a change in an image between the image frames. For example, server device 20 acquires all the pieces of advertisement content created by advertiser 2, creates fingerprints which individually correspond to all the pieces of advertisement content, and accumulates the created fingerprints in a storage.

For example, advertisement server device 30 is a Web server. Advertisement server device 30 is configured to distribute additional information, which is related to the result of the image recognition performed in reception device 10, to reception device 10. For example, advertisement server device 30 is an advertisement distribution server that holds and distributes advertisements of a variety of commercial goods.

Note that, in this exemplary embodiment, it is defined that server device 20 and advertisement server device 30 are Web servers independent of each other; however, server device 20 and advertisement server device 30 may be included in one Web server.

A description is made below of respective configurations of reception device 10, server device 20 and advertisement server device 30.

[1-1-1. Reception Device]

Figure 2:
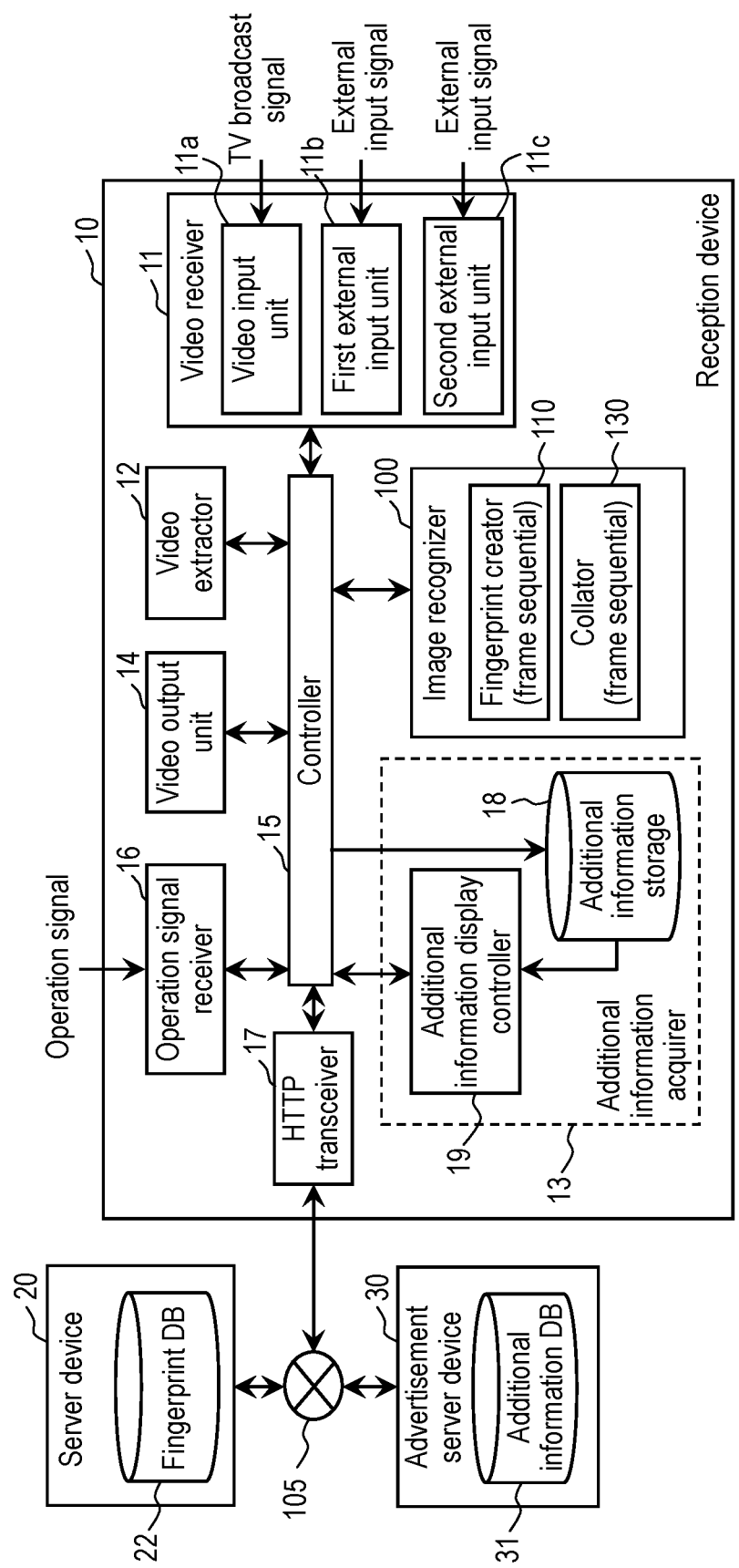
FIG. 2 is a block diagram showing a configuration example of a reception device in the first exemplary embodiment.

First, a description is made of reception device 10 in this exemplary embodiment with reference to FIG. 2 as well as FIG. 1.

FIG. 2 is a block diagram showing a configuration example of reception device 10 in the first exemplary embodiment. Note that FIG. 2 shows a main hardware configuration of reception device 10.

As shown in FIG. 1, reception device 10 includes: video receiver 11; video extractor 12; additional information acquirer 13; video output unit 14; and image recognizer 100. More specifically, as shown in FIG. 2, reception device 10 further includes: controller 15; operation signal receiver 16; and HTTP (Hyper Text Transfer Protocol) transceiver 17.

Controller 15 is a processor configured to control the respective constituent elements provided in reception device 10. Controller 15 includes a nonvolatile memory, a CPU (Central Processing Unit), and a volatile memory. For example, the nonvolatile memory is a ROM (Read Only Memory) or the like, and stores a program (application program or the like). The CPU is configured to execute the program. For example, the volatile memory is a RAM (Random Access Memory) or the like, and is used as a temporal working area when the CPU operates.

Operation signal receiver 16 is a circuit configured to receive an operation signal output from an operator (not shown). The operation signal is a signal output from the operator (for example, a remote controller) in such a manner that the user operates the operator in order to operate reception device 10. Note that, in a case where the operator is a remote controller having a gyro sensor, operation signal receiver 16 may be configured to receive information regarding a physical motion of the remote controller itself, which is output from the remote controller (that is, the information is a signal indicating a motion of the remote controller when the user performs shaking, tilting, direction change and so on for the remote controller).

HTTP transceiver 17 is an interface configured to communicate with server device 20 and advertisement server device 30 via communication network 105. For example, HTTP transceiver 17 is a communication adapter for a wired LAN (Local Area Network), which adapts to the standard of IEEE 802.3.

HTTP transceiver 17 acquires the fingerprints, which are transmitted from server device 20 via communication network 105, and the like. The acquired fingerprints are output to image recognizer 100 via controller 15. Moreover, for example, HTTP transceiver 17 acquires the additional information, which is transmitted from advertisement server device 30 via communication network 105. The acquired additional information is stored in additional information storage 18 via controller 15.

Video receiver 11 has a reception circuit and a decoder (either of which is not shown), the reception circuit being configured to receive the video content. For example, video receiver 11 performs the selection of the received broadcast channel, the selection of the signal, which is input from the outside, and the like based on the operation signal received in operation signal receiver 16. The video content received by video receiver 11 includes the pieces of advertisement content.

As shown in FIG. 2, video receiver 11 includes: video input unit 11a; first external input unit 11b; and second external input unit 11c.

Video input unit ha is a circuit configured to receive the video signal transmitted from the outside, such as a broadcast signal (referred to as a "TV broadcast signal" in FIG. 2), which is received, for example, by an antenna (not shown).

First external input unit 11b and second external input unit 11c are interfaces configured to receive the video signals (referred to as "external input signals" in FIG. 2), which are transmitted from external instruments such as STB 4, a video signal recording/playback device (not shown), and the like. For example, first external input unit 11b is an HDMI (registered trademark) terminal, and is connected to STB 4 by a cable conforming to the HDMI (registered trademark).

Video extractor 12 extracts the plurality of image frames at a predetermined frame rate from the frame sequence that composes the advertisement content received by video receiver 11. For example, in a case where the frame rate of the advertisement content is 60 fps (Frames Per Second), video extractor 12 extracts the plurality of image frames at such a frame rate as 30 fps, 20 fps and 15 fps. Note that, if image recognizer 100 at a subsequent stage has a processing capability sufficient for processing a video at 60 fps, then video extractor 12 may extract all of the image frames which compose the frame sequence of the advertisement content.

Video output unit 14 is a display control circuit configured to output the video content, which is received by video receiver 11, to the display screen. For example, the display screen is a display such as a liquid crystal display device, an organic EL (Electro Luminescence), and the like.

Additional information acquirer 13 operates as a circuit and a communication interface, which acquire information. Additional information acquirer 13 is configured to acquire the additional information from advertisement server device 30 based on the result of the image recognition by image recognizer 100. Additional information acquirer 13 includes: additional information storage 18; and additional information display controller 19.

Additional information storage 18 is a storage device configured to store the additional information. For example, additional information storage 18 is a nonvolatile storage element such as a flash memory or the like. Additional information storage 18 may hold program meta information such as an EPG (Electronic Program Guide) or the like in addition to the additional information acquired from advertisement server device 30.

Additional information display controller 19 is configured to superimpose the additional information, which is acquired from advertisement server device 30, onto the video content (for example, advertisement content) received in video receiver 11. Additional information display controller 19 creates a superimposed image by superimposing the additional information onto each image frame included in the advertisement content, and outputs the created superimposed image to video output unit 14. Video output unit 14 outputs the superimposed image to the display screen, whereby the advertisement content onto which the additional information is superimposed is displayed on the display screen.

Details of image recognizer 100 will be described later.

[1-1-2. Server Device]

Next, a description is made of server device 20.

Server device 20 acquires the advertisement content transmitted from advertiser 2, and creates the recognition data corresponding to the acquired advertisement content.

As shown in FIG. 1, server device 20 includes: content receiver 21; fingerprint DB (Data Base) 22; and fingerprint creator 110. Note that, in server device 20 in FIG. 2, only fingerprint DB 22 is shown, and content receiver 21 and fingerprint creator 110 are omitted.

Content receiver 21 includes a reception circuit and a decoder, and is configured to receive the advertisement content transmitted from advertiser 2. For example, content receiver 21 receives all the pieces of advertisement content created and transmitted by advertiser 2. Content receiver 21 outputs the received pieces of advertisement content to fingerprint creator 110.

Fingerprint creator 110 is configured to create the fingerprint for each piece of the advertisement content. Fingerprint creator 110 creates the fingerprint based on a change between the image frames in the frame sequence that composes the advertisement content. Note that, for example, fingerprint creator 110 provided in server device 20 may be configured and operate in substantially the same way as fingerprint creator 110 provided in image recognizer 100 of reception device 10. Details of fingerprint creator 110 will be described later with reference to FIG. 5.

Fingerprint DB 22 is a database in which information representing the advertisement content and the fingerprint are associated with each other for each piece of the advertisement content. In fingerprint DB 22, for example, identification information (for example, content IDs (IDentifiers)) for identifying the plurality of pieces of advertisement content from one another and the fingerprints are associated with each other. Every time when new advertisement content is received in content receiver 21, server device 20 creates new fingerprints in fingerprint creator 110, and updates fingerprint DB 22.

Fingerprint DB 22 is stored in a storage device (for example, an HDD (Hard Disk Drive) or the like) provided in server device 20. Note that fingerprint DB 22 may be stored in a storage device placed at the outside of server device 20.

Server device 20 includes a communicator (not shown), and is capable of communicating with reception device 10 via the communicator and communication network 105. For example, server device 20 receives a request (a request requesting fingerprint DB 22), which is transmitted from reception device 10, via the communicator, and transmits fingerprint DB 22 to reception device 10 in response to the received request. Note that, when fingerprint DB 22 is updated, server device 20 may transmit update information of fingerprint DB 22 to reception device 10 via the communicator.

[1-1-3. Advertisement Server Device]

Next, a description is made of advertisement server device 30.

Advertisement server device 30 is a Web server configured to distribute the additional information regarding the advertisement content transmitted from advertiser 2. As shown in FIG. 1, advertisement server device 30 includes additional information DB 31.

Additional information DB 31 is a database in which the information representing the advertisement content and the additional information are associated with each other for each piece of the advertisement content. In additional information DB 31, for example, the content IDs and the additional information are associated with each other.

Additional information DB 31 is stored in a storage device (for example, HDD) provided in advertisement server device 30. Note that additional information DB 31 may be stored in a storage device placed at the outside of advertisement server device 30.

For example, the additional information is information indicating an attribute of an object (for example, commercial goods as an advertisement target, and the like), which is displayed in the advertisement content. For example, the additional information is information regarding the commercial goods, such as specifications of the commercial goods, a dealer (for example, address, URL (Uniform Resource Locator), telephone number and the like of the dealer), manufacturer, method of use, effect and the like.

[1-2. Image Recognizer]

Subsequently, a description is made of image recognizer 100 in this exemplary embodiment.

Image recognizer 100 is an example of an image recognition device, and is a processor configured to perform the recognition (for example, ACR) of the video content. The video content includes the plurality of image frames extracted by video extractor 12, and is a target of the image recognition by image recognizer 100. For example, image recognizer 100 can be realized by an integrated circuit or the like.

As shown in FIG. 1, image recognizer 100 includes: fingerprint creator 110; fingerprint acquirer 120; collator 130; and output unit 140. Note that in image recognizer 100 in FIG. 2, only fingerprint creator 110 and fingerprint acquirer 120 are shown, and collator 130 and output unit 140 are omitted.

Fingerprint creator 110 is an example of a recognition data creation circuit. Fingerprint creator 110 is configured to create the recognition data for use in recognition of the video content. Specifically, fingerprint creator 110 acquires the plurality of image frames included in the frame sequence that composes the video content, and creates the recognition data based on such an inter-frame change in the image in the acquired image frames. The recognition data is, for example, the fingerprint. Details of fingerprint creator 110 will be described later with reference to FIG. 5.

Fingerprint acquirer 120 is an example of an acquirer. Fingerprint acquirer 120 acquires a plurality of pieces of recognition data which correspond to respective pieces of video content. Specifically, fingerprint acquirer 120 acquires the fingerprints which correspond to respective pieces of video content, from server device 20. The plurality of acquired fingerprints are used for collation with the fingerprint of the video content, which is created in fingerprint creator 110.

Note that fingerprint acquirer 120 may include a storage (not shown). In that case, fingerprint acquirer 120 can acquire the plurality of fingerprints from server device 20 in advance and can store the same in the storage. Hence, immediately after the fingerprint is created by fingerprint creator 110, collator 130 can start the collation of the created fingerprint.

Collator 130 collates the fingerprint, which is the recognition data created in fingerprint creator 110, with the plurality of fingerprints, which are acquired from server device 20 by fingerprint acquirer 120 and stored in the storage.

More specifically, collator 130 collates each of a static fingerprint and a dynamic fingerprint, which are included in the fingerprint created in fingerprint creator 110, with the plurality of pieces of recognition data acquired from server device 20 by fingerprint acquirer 120. Then, collator 130 selects recognition data, which is similar to the static fingerprint or the dynamic fingerprint, from among the plurality of pieces of recognition data acquired from server device 20, and outputs information, which corresponds to the selected recognition data, as a collation result. For example, collator 130 selects recognition data, to which at least two of one or more static fingerprints and one or more dynamic fingerprints are similar, the static fingerprints and the dynamic fingerprints being included in the recognition data created in fingerprint creator 110, and outputs information, which corresponds to the recognition data, as the collation result.

Note that details of the operations of the static fingerprints, the dynamic fingerprints and collator 130 will be described later.

Based on the collation result received from collator 130, output unit 140 outputs information, which indicates the video content received by video receiver 11, as a result of the image recognition. For example, the result of the image recognition is a content ID, which indicates the video content received by video receiver 11.

Note that, in a case where collator 130 cannot find the fingerprint, which is similar to the fingerprint created in fingerprint creator 110, from the plurality of fingerprints acquired in fingerprint acquirer 120, that is, in a case where collator 130 cannot detect the content corresponding to the video content and cannot successfully perform the image recognition, output unit 140 outputs nothing. Alternatively, output unit 140 may output information, which indicates that the image recognition cannot be successfully performed, as the result of the image recognition.

[1-3. Fingerprint Creator]

Next, a description is made of fingerprint creator 110 in this exemplary embodiment.

Fingerprint creator 110 is an example of a recognition data creation device. Fingerprint creator 110 is configured to create the fingerprint based on at least one of a static region and a dynamic region in the frame sequence that composes the video content. For example, fingerprint creator 110 can be realized by an integrated circuit and the like.

First, the static region and the dynamic region will be described below with reference to FIG. 3 and FIG. 4.

Video extractor 12 of FIG. 2 is configured to extract the plurality of image frames at the predetermined frame rate from the frame sequence that composes the video content. This frame rate is set based on the processing capability and the like of image recognizer 100. In this exemplary embodiment, a description is made of an operation example when the frame rate of the video content broadcasted from broadcast station 3 is 60 fps, and video extractor 12 extracts the image frames at three frame rates which are 30 fps, 20 fps and 15 fps. Note that video extractor 12 does not extract the image frames at a plurality of frame rates. FIG. 3 and FIG. 4 merely show operation examples in case where frame rates for use in extraction are different from one another. In the example shown in FIG. 3 and FIG. 4, video extractor 12 extracts the image frames at any frame rate of 30 fps, 20 fps and 15 fps.

[1-3-1. Static Region]

The static region refers to a region in which the variation in the image between two image frames is smaller than a predetermined threshold (hereinafter, referred to as a "first threshold"). For example, the static region is a background in an image, a region occupied by a subject with a small motion and a small change, or the like. The static region is decided by calculating the variation in the image between the image frames.

Figure 3:
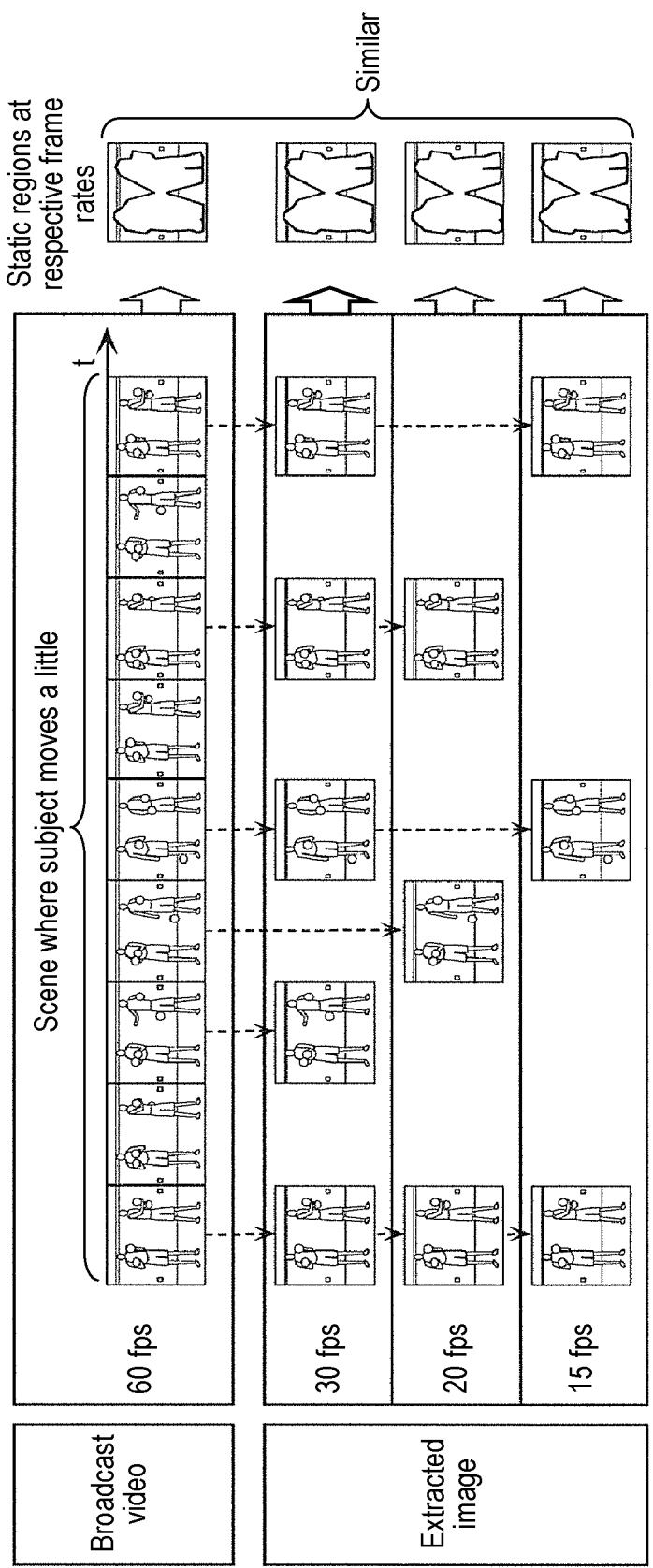
FIG. 3 is a view schematically showing an example of relationships between image frames and static regions at respective frame rates, which are extracted in a video extractor in the first exemplary embodiment.

FIG. 3 is a view schematically showing an example of relationships between the image frames and the static regions at the respective frame rates, which are extracted in video extractor 12 in the first exemplary embodiment.

In video content of a broadcast video, which is shown as an example in FIG. 3, the same scene, which has a video with no large change, is composed of 9 frames. In the video, two subjects move; however, the background does not move.

As shown in FIG. 3, no matter which frame rate of 30 fps, 20 fps and 15 fps video extractor 12 may extract the image frames at, such static regions decided at the respective frame rates are similar to one another, and are similar to the static region decided in the broadcasted video content at 60 fps.

From this, it is understood that, no matter which of 30 fps, 20 fps and 15 fps the frame rate in extracting the image frames may be, it is possible to recognize the video content by collating the static region, which is decided in the image frames extracted in video extractor 12, with the static region, which is decided in the broadcasted video content. The static region is a region occupied by the background, the subject with small motion and change, and the like in the image frames, and is a region highly likely to be present in the image frames during a predetermined period (for example, a few seconds). Hence, highly accurate recognition is possible with use of the static region.

In this exemplary embodiment, the static region in the broadcasted video content is decided in advance by server device 20. Hence, reception device 10 can recognize the video content under reception by collating the static region, which is decided based on the image frames extracted in video extractor 12, with the static region acquired from server device 20.

[1-3-2. Dynamic Region]

The dynamic region refers to a region in which the variation in the image between two image frames is larger than a predetermined threshold (hereinafter, referred to as a "second threshold"). For example, the dynamic region is a region in which there occurs a large change in the image at a time when the scene is switched, or the like.

Figure 4:
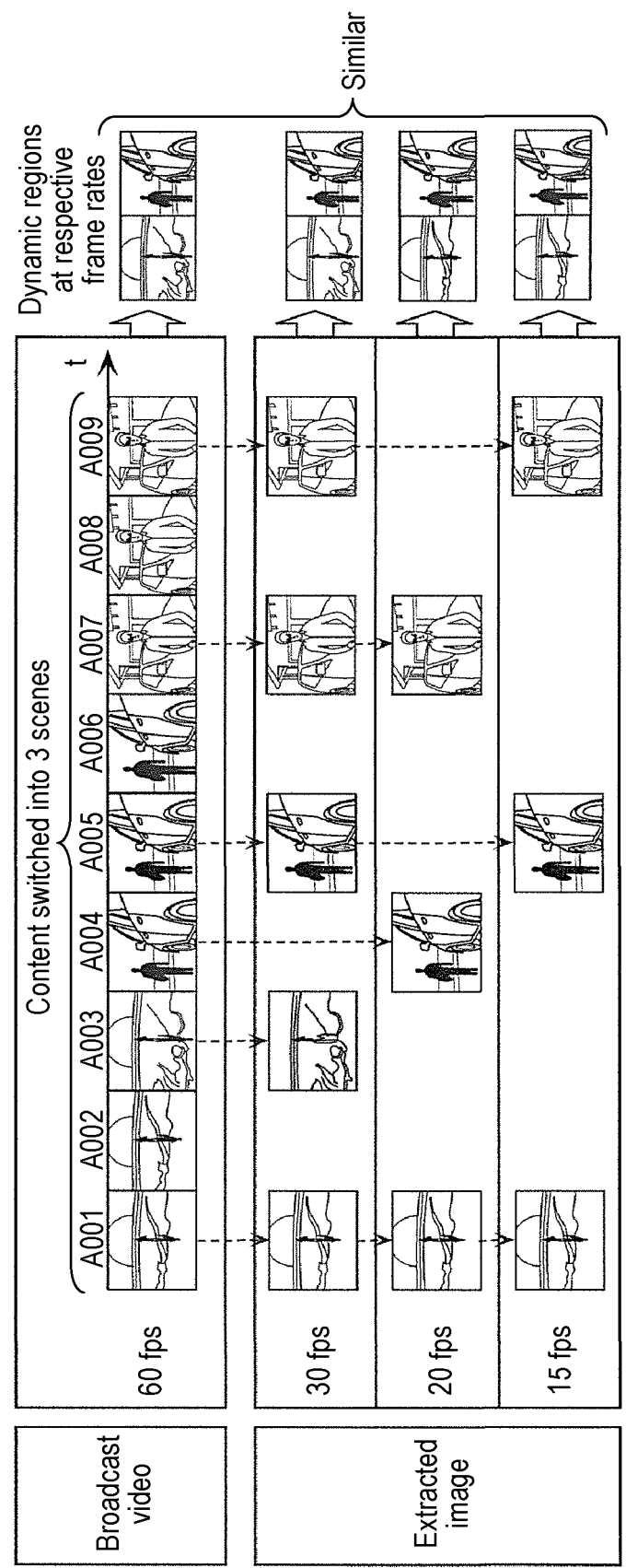
FIG. 4 is a view schematically showing an example of relationships between image frames and dynamic regions at respective frame rates, which are extracted in the video extractor in the first exemplary embodiment.

FIG. 4 is a view schematically showing an example of relationships between the image frames and the dynamic regions at the respective frame rates, which are extracted in video extractor 12 in the first exemplary embodiment.

Video content shown as an example in FIG. 4 includes scene switching. The video content shown in FIG. 4 includes 3 scenes, namely first to third scenes switched with the elapse of time. The first scene includes image frames A001 to A003, the second scene includes image frames A004 to A006, and the third scene includes image frames A007 to A009.

The dynamic region is decided by calculating the variation in the image between the image frames.

In the example shown in FIG. 4, no matter which of 30 fps, 20 fps and 15 fps the frame rate may be, the respective image frames of the 3 scenes are included in the plurality of image frames extracted in video extractor 12. Therefore, when the variation in the image is calculated between two image frames temporally adjacent to each other, a large variation is calculated between the image frames before and after the scene switching. Note that FIG. 4 shows, as an example, the dynamic regions at the scene switching from the first scene to the second scene.

For example, at 30 fps in FIG. 4, the switching between the first scene and the second scene is made between image frame A003 and image frame A005. Hence, at 30 fps in FIG. 4, the dynamic region occurs between image frame A003 and image frame A005. Similarly, at 20 fps in FIG. 4, the dynamic region occurs between image frame A001 and image frame A004, and at 15 fps in FIG. 4, the dynamic region occurs between image frame A001 and image frame A005.

Meanwhile, in the broadcasted video content at 60 fps, the switching between the first scene and the second scene is made between image frame A003 and image frame A004. Hence, in the broadcasted video content, the dynamic region occurs between image frame A003 and image frame A004.

That is to say, the dynamic region in the broadcasted video content at 60 fps and the respective dynamic regions at 30 fps, 20 fps and 15 fps, which are extracted by video extractor 12, are similar to each other as shown in FIG. 4.

As described above, no matter which frame rate of 30 fps, 20 fps and 15 fps video extractor 12 may extract the image frames at, such dynamic regions decided at the respective frame rates are similar to one another, and are similar to the dynamic region decided in the broadcasted video content at 60 fps.

From this, it is understood that, no matter which of 30 fps, 20 fps and 15 fps the frame rate in extracting the image frames may be, it is possible to recognize the video content by collating the dynamic region, which is decided based on the image frames extracted in video extractor 12, with the dynamic region, which is decided in the broadcasted video content. The dynamic region is a region where such a large change in the image occurs by the scene switching and the like, and is a region where a characteristic change in the image occurs. Hence, highly accurate recognition is possible with use of the dynamic region. Moreover, since the recognition is performed based on the characteristic change in the image, the number of frames necessary for the recognition can be reduced in comparison with a conventional case, and a speed of the processing relating to the recognition can be increased.

In this exemplary embodiment, the dynamic region in the broadcasted video content is decided in advance by server device 20. Hence, reception device 10 can recognize the video content under reception by collating the dynamic region, which is decided based on the image frames extracted in video extractor 12, with the dynamic region acquired from server device 20.

[1-3-3. Configuration]

Figure 5:
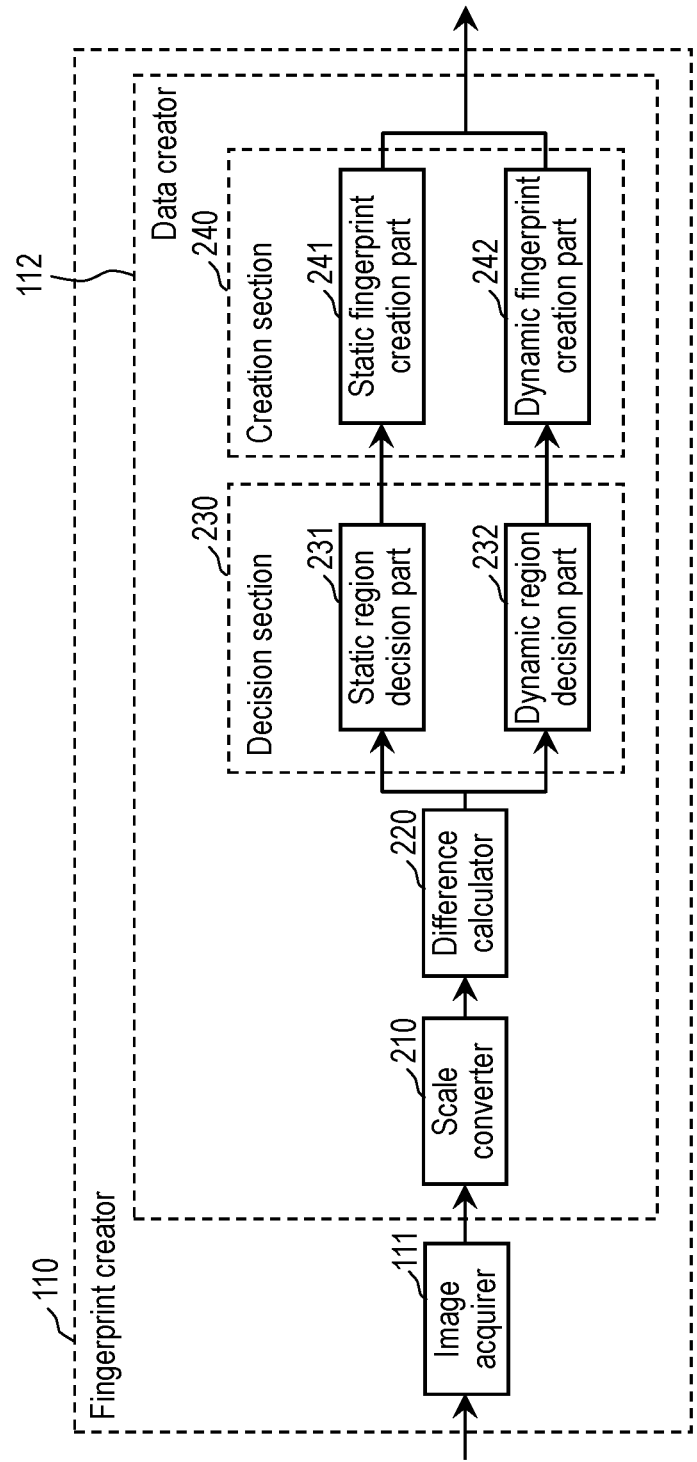
FIG. 5 is a block diagram showing a configuration example of a fingerprint creator in the first exemplary embodiment.

Next, a description is made of fingerprint creator 110 in this exemplary embodiment with reference to FIG. 5.

FIG. 5 is a block diagram showing a configuration example of fingerprint creator 110 in the first exemplary embodiment.

As shown in FIG. 5, fingerprint creator 110 includes: image acquirer 111; and data creator 112.

Image acquirer 111 acquires the plurality of image frames extracted by video extractor 12.

Data creator 112 creates the fingerprints as the recognition data based on such inter-frame changes in the images between the plurality of image frames acquired by image acquirer 111. The fingerprints include at least one of the static fingerprint, which is based on the static region in which the inter-frame image variation is smaller than the first threshold, and the dynamic fingerprint, which is based on the dynamic region, which is based on the dynamic region in which the inter-frame image variation is larger than the second threshold. Note that, depending on values of the first threshold and the second threshold, neither the static fingerprint nor the dynamic fingerprint is sometimes created. In this case, the fingerprints include neither the static fingerprint nor the dynamic fingerprint.

Data creator 112 includes: scale converter 210; difference calculator 220; decision section 230; and creation section 240.

Scale converter 210 executes scale conversion individually for the plurality of image frames acquired by image acquirer 111. Specifically, scale converter 210 executes gray scale conversion and down scale conversion for the respective image frames.

The gray scale conversion refers to conversion of a color image into a gray scale image. Scale converter 210 converts color information of each pixel of the image frame into a brightness value, and thereby converts a color image into a gray scale image. The present disclosure does not limit a method of this conversion. For example, scale converter 210 may extract one element of R, G and B from each pixel, and may convert the extracted element into a brightness value of the corresponding pixel. Note that the brightness value is a numeric value indicating the brightness of the pixel, and is an example of a pixel value. Alternatively, scale converter 210 may calculate the brightness value by using an NTSC-system weighted average method, an arithmetical average method, and the like.

The down scale conversion refers to conversion of the number of pixels which compose one image frame from an original number of pixels into a smaller number of pixels. Scale converter 210 executes the down scale conversion, and converts the image of the image frame into the image composed of a smaller number of pixels. The present disclosure does not limit a method of this conversion. For example, scale converter 210 may divide each image into a plurality of blocks, each of which includes a plurality of pixels, may calculate one numeric value for each of the regions, and may thereby perform the down scale conversion. At this time, for each of the regions, scale converter 210 may calculate an average value, intermediate value or the like of the brightness value, and may define the calculated value as a numeric value representing the brightness of the region.

Note that, in this exemplary embodiment, it is defined that scale converter 210 performs both of the gray scale conversion and the down scale conversion; however, the present disclosure is never limited to this configuration. Scale converter 210 may perform only either one or neither of the conversions. That is to say, data creator 112 does not have to include scale converter 210.

Difference calculator 220 creates an image-changed frame from each of the plurality of image frames acquired by image acquirer 111. The image-changed frame is created by calculating a difference of the brightness value between two image frames temporally adjacent to each other (for example, two temporally continuous image frames). Hence, the image-changed frame indicates a variation (hereinafter, referred to as a "brightness-changed value") of the brightness value between the two temporally adjacent image frames. Note that the brightness-changed value is an example of a pixel-changed value, and is a value indicating the variation of the brightness value as an example of the pixel value. Difference calculator 220 creates the image-changed frame by using the image frames subjected to the gray scale conversion and the down scale conversion by scale converter 210.

Decision section 230 includes: static region decision part 231; and dynamic region decision part 232.

Decision section 230 compares an absolute value of each brightness-changed value of such image-changed frames, which are created in difference calculator 220, with the first threshold and the second threshold. Then, decision section 230 decides at least one of the static region in which the absolute value of the brightness-changed value is smaller than the first threshold and the dynamic region in which the absolute value of the brightness-changed value is larger than the second threshold. Specifically, decision section 230 individually calculates such absolute values of the respective brightness-changed values of the image-changed frames, and individually executes a determination as to whether or not the absolute values are smaller than the first threshold and a determination as to whether or not the absolute values are larger than the second threshold, and thereby decides the static region and the dynamic region.

Note that the calculation of the absolute values of the brightness-changed values may be performed in difference calculator 220.

The first threshold and the second threshold are set at predetermined numeric values, and are decided based on a range which the brightness-changed values can take. For example, the first threshold and the second threshold are determined within a range of 0% to 20% of a maximum value of the absolute values of the brightness-changed values. As a specific example, in a case where the maximum value of the absolute values of the brightness-changed values is 255, then the first threshold is "1", and the second threshold is "20". Note that these numeric values are merely an example. It is desirable that the respective thresholds be set as appropriate. The first threshold and the second threshold may be the same numeric value, or may be different numeric values. Moreover, it is desirable that the second threshold be larger than the first threshold; however, the second threshold may be smaller than the first threshold.

Static region decision part 231 provided in decision section 230 compares the respective absolute values of the brightness-changed values of the image-changed frames with the first threshold, and determines whether or not the absolute values are smaller than the first threshold, and thereby decides the static region. For example, in a case where the first threshold is "1", static region decision part 231 defines a region in which the brightness-changed value is "0" as the static region. The region in which the brightness-changed value is "0" is a region in which the brightness value is not substantially changed between two temporally adjacent image frames.

Dynamic region decision part 232 provided in decision section 230 compares the respective absolute values of the brightness-changed values of the image-changed frames with the second threshold, and determines whether or not the absolute values are larger than the second threshold, and thereby decides the dynamic region. For example, in a case where the second threshold is "20", dynamic region decision part 232 defines a region in which the absolute value of the brightness-changed value is "21" or more as the dynamic region. The region in which the absolute value of the brightness-changed value is "21" or more is a region in which the brightness value is changed by 21 or more between two temporally adjacent image frames.

Note that, for the determination, static region decision part 231 and dynamic region decision part 232 use the absolute values of the brightness-changed values of the image-changed frames, which are based on the image frames subjected to the gray scale conversion and the down scale conversion in scale converter 210.

Creation section 240 includes: static fingerprint creation part 241; and dynamic fingerprint creation part 242.

Static fingerprint creation part 241 determines whether or not the static region output from static region decision part 231 occupies a predetermined ratio (hereinafter, referred to as a "first ratio") or more in each image-changed frame. Then, in a case where the static region occupies the first ratio or more, static fingerprint creation part 241 creates the static fingerprint as below based on the static region. Otherwise, static fingerprint creation part 241 does not create the static fingerprint. Static fingerprint creation part 241 creates the static fingerprint in a case where the occupied range of the static region in the image-changed frame is large, in other words, in a case where the change in the image is small between two temporally adjacent image frames.

Static fingerprint creation part 241 creates a static frame by filtering, in the static region, one of the two image frames used for creating the image-changed frame. This filtering will be described later. Then, static fingerprint creation part 241 defines the created static frame as the static fingerprint. The static frame is a frame including a brightness value of the static region of one of the two image frames used for creating the image-changed frame, and in which a brightness value of other region than the static region is a fixed value (for example, "0"). Details of the static frame will be described later.

Dynamic fingerprint creation part 242 determines whether or not the dynamic region output from dynamic region decision part 232 occupies a predetermined ratio (hereinafter, referred to as a "second ratio") or more in each image-changed frame. Then, in a case where the dynamic region occupies the second ratio or more, dynamic fingerprint creation part 242 creates the dynamic fingerprint as below based on the dynamic region. Otherwise, dynamic fingerprint creation part 242 does not create the dynamic fingerprint. Dynamic fingerprint creation part 242 creates the dynamic fingerprint in a case where the occupied range of the dynamic region in the image-changed frame is large, in other words, in a case where the change in the image is large between two temporally adjacent image frames.

Dynamic fingerprint creation part 242 creates a dynamic frame by filtering the image-changed frame in the dynamic region. This filtering will be described later. Then, dynamic fingerprint creation part 242 defines the created dynamic frame as the dynamic fingerprint. The dynamic frame is a frame including a brightness value of the dynamic region of the image-changed frame, and in which a brightness value of other region than the dynamic region is a fixed value (for example, "0"). Details of the dynamic frame will be described later.

Note that predetermined numeric values are set for the first ratio and the second ratio. For example, the first ratio and the second ratio are determined within a range of 20% to 40%. As a specific example, the first ratio and the second ratio are individually 30%. Note that these numeric values are merely an example. It is desirable that the first ratio and the second ratio be set as appropriate. The first ratio and the second ratio may be the same numeric value, or may be different numeric values.

By the configuration described above, fingerprint creator 110 creates either one of the static fingerprint and the dynamic fingerprint for each of the image frames. Otherwise, fingerprint creator 110 does not create either of these. That is to say, in a case of acquiring N pieces of the image frames from the video content, fingerprint creator 110 creates fingerprints including at most N−1 pieces of the fingerprints as a sum of the static fingerprints and the dynamic fingerprints.

Note that it is highly likely that the respective static fingerprints created in the same continuous scene will be similar to one another. Hence, in a case where the plurality of continuous image frames reflects the same scene, static fingerprint creation part 241 may select and output one static fingerprint from the plurality of static fingerprints created from the same scene.

[1-4. Operation]

Next, a description is made of an operation of content recognition system 1 in this exemplary embodiment with reference to FIG. 6 to FIG. 21. Note that it is assumed that server device 20 creates the fingerprints of the plurality of pieces of video content in advance, and holds fingerprint DB 22 in which the created fingerprint and the content IDs are associated with each other.

[1-4-1. Overall Operation]

Figure 6:
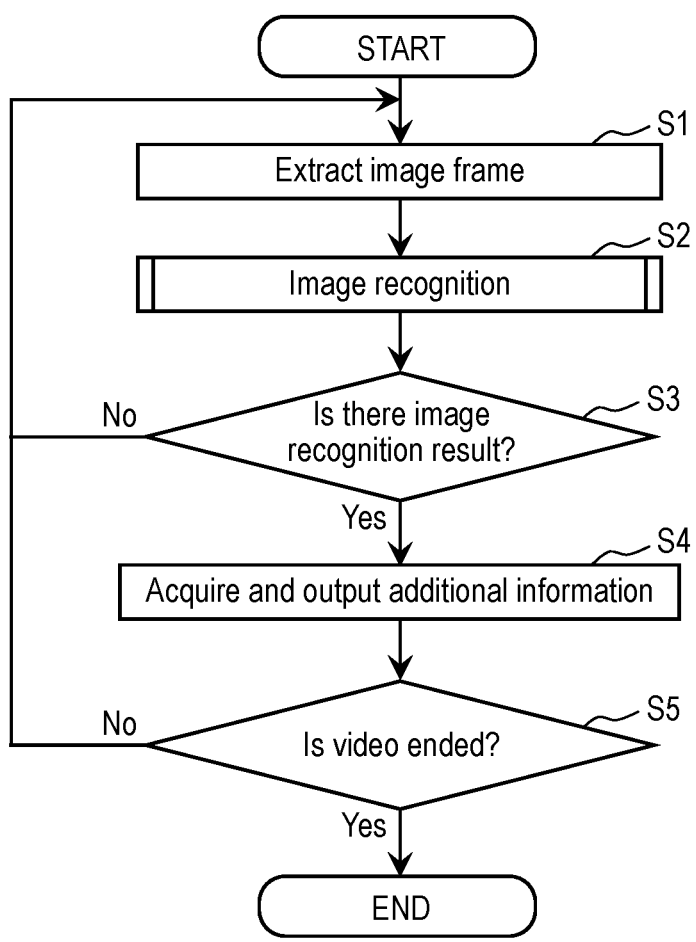
FIG. 6 is a flowchart showing an operation example of a reception device provided in the content recognition system in the first exemplary embodiment.

First, a description is made of an overall operation of content recognition system 1 in this exemplary embodiment with reference to FIG. 6.

FIG. 6 is a flowchart showing an operation example of reception device 10 provided in content recognition system 1 in the first exemplary embodiment.

When video receiver 11 receives the video content, video extractor 12 extracts the plurality of image frames at the predetermined frame rate from the frame sequence that composes the video content (Step S1).

Image recognizer 100 acquires the plurality of image frames extracted in video extractor 12, and performs the image recognition based on an inter-frame change of the plurality of acquired image frames (Step S2). Details of processing of the image recognition will be described later with reference to FIG. 7.

Image recognizer 100 outputs the result of the image recognition when the image recognition can be successfully performed in Step S2, and does not output the result of the image recognition when the image recognition cannot be successfully performed therein (Step S3).

When the result of the image recognition is output from image recognizer 100 in Step S3 (Yes in Step S3), additional information acquirer 13 acquires the additional information from advertisement server device 30 based on the result of the image recognition (Step S4). Then, video output unit 14 superimposes the acquired additional information onto the video content, and outputs the same.

When the result of the image recognition is not output from image recognizer 100 in Step S3 (No in Step S3), the processing of reception device 10 returns to Step S1, and the extraction of the image frames in Step S1 and the image recognition in Step S2 are repeated. In reception device 10, when the content corresponding to the video content is not detected, the result of the image recognition is not output from image recognizer 100, and a determination of No is made in Step S3.

After Step S4, it is determined whether or not the video content is ended (Step S5). Specifically, the determination in Step S5 is made based on whether or not video receiver 11 can acquire the video content, that is, whether or not the video content is input to reception device 10.

In a case where it is determined in Step S5 that the video content is ended (Yes in Step S5), the processing of content recognition system 1 is ended. When video receiver 11 cannot acquire the video content (when the video content is not input to reception device 10), a determination of Yes is made in Step S5, and the processing of content recognition system 1 is ended.

In a case where it is determined in Step S5 that the video content is not ended (No in Step S5), that is, if the input of the video content to reception device 10 continues, then the processing of content recognition system 1 returns to Step S1, and the series of processing on and after Step S1 is repeated.

[1-4-2. Image Recognition]

Figure 7:
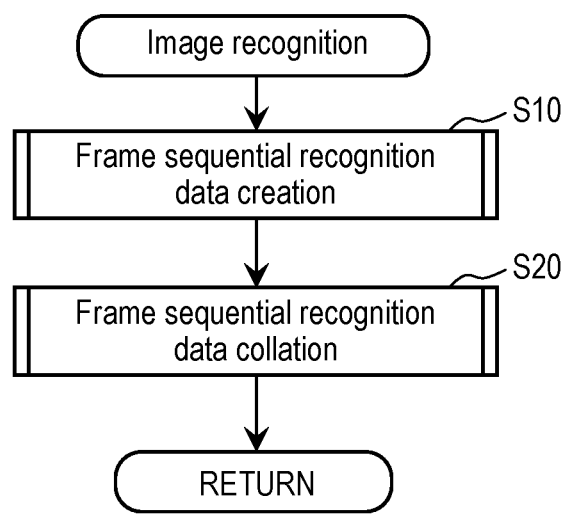
FIG. 7 is a flowchart showing an example of processing for image recognition in the first exemplary embodiment.

Next, a description is made of an operation of image recognizer 100 in this exemplary embodiment with reference to FIG. 7.

FIG. 7 is a flowchart showing an example of the processing for the image recognition in the first exemplary embodiment. The flowchart of FIG. 7 shows an overview of the processing executed in Step S2 of FIG. 6.

Fingerprint creator 110 of image recognizer 100 creates the recognition data based on the change in the image between the image frames in the plurality of image frames extracted from the frame sequence of the video content in Step S1 (Step S10). Note that, in FIG. 7, Step S10 is referred to as "frame sequential recognition data creation". Details of Step S10 will be described later with reference to FIG. 8.

Next, collator 130 of image recognizer 100 collates the recognition data, which is created by fingerprint creator 110 in Step S10, with the plurality of pieces of recognition data acquired from server device 20 by fingerprint acquirer 120 (Step S20). Note that, in FIG. 7, Step S20 is referred to as "frame sequential recognition data collation". Details of Step S20 will be described later with reference to FIG. 17.

[1-4-3. Frame Sequential Recognition Data Creation]

Next, details of the processing when the recognition data is created in this exemplary embodiment are described with reference to FIG. 8 to FIG. 16B.

First, an overview of the processing at a time of creating the recognition data is described with reference to FIG. 8.

Figure 8:
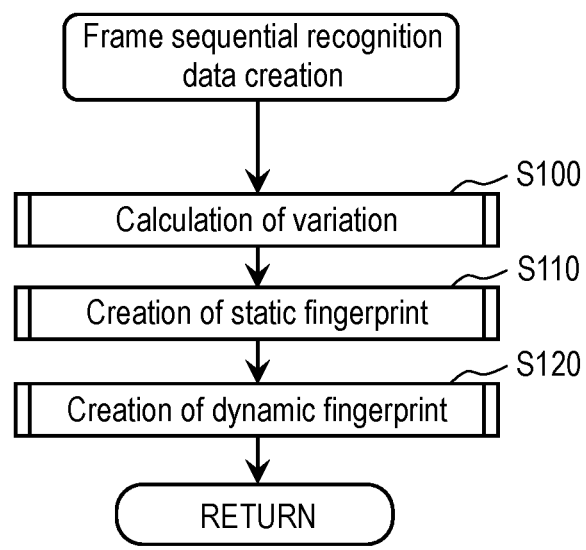
FIG. 8 is a flowchart showing an example of processing at a time of creating recognition data in the first exemplary embodiment.

FIG. 8 is a flowchart showing an example of the processing at the time of creating the recognition data in the first exemplary embodiment. The flowchart of FIG. 8 shows an overview of the processing executed in Step S10 of FIG. 7.

First, fingerprint creator 110 calculates the variations in the image between the image frames from the plurality of image frames extracted in Step S1 (Step S100). Details of such a calculation of the variations in the image will be described later with reference to FIG. 10 to FIG. 12.

Next, fingerprint creator 110 creates the static fingerprints (Step S110).

Fingerprint creator 110 decides the static region based on the image-changed frame, and creates the static fingerprints based on the decided static region. Details of the creation of the static fingerprints will be described later with reference to FIG. 13 and FIG. 14.

Next, fingerprint creator 110 creates the dynamic fingerprints (Step S120).

Fingerprint creator 110 decides the dynamic region based on the image-changed frame, and creates the dynamic fingerprints based on the decided dynamic region. Details of the creation of the dynamic fingerprints will be described later with reference to FIG. 15, FIG. 16A and FIG. 16B.

Note that either of the processing for creating the static fingerprints in Step S110 and the processing for creating the dynamic fingerprints in Step S120 may be executed first, or alternatively, both thereof may be executed simultaneously.

Here, the changes of the image frames in the process of the recognition data creating processing are described with reference to an example in FIG. 9.

Figure 9:
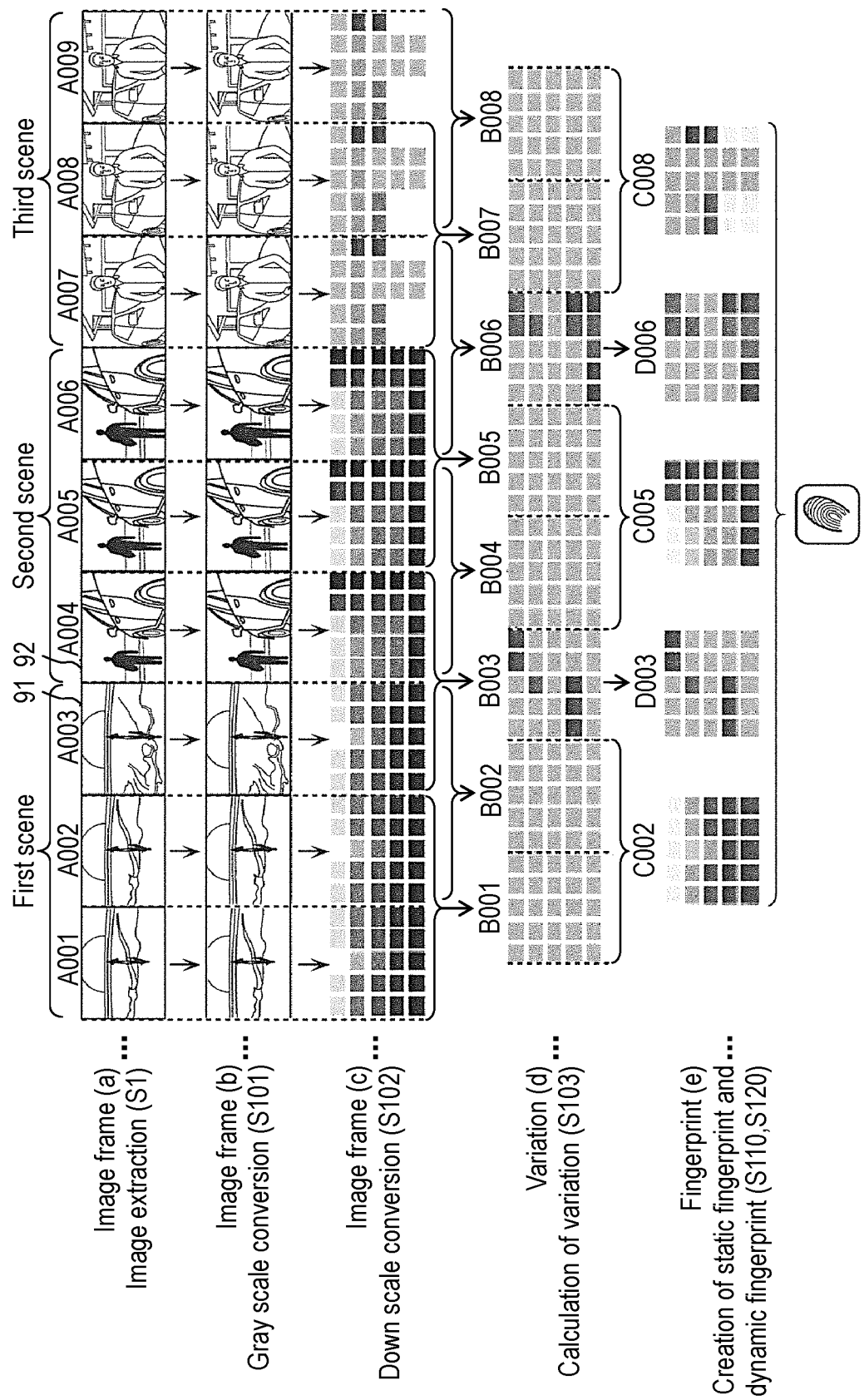
FIG. 9 is a view schematically showing an example of changes of the image frames in a process of recognition data creating processing in the first exemplary embodiment.

FIG. 9 is a view schematically showing an example of the changes of the image frames in the process of the recognition data creating processing in the first exemplary embodiment.

Note that FIG. 9 schematically shows: a plurality of image frames (a) extracted in Step S1; image frames (b) subjected to the gray scale conversion in Step S101 to be described later; image frames (c) subjected to the down scale conversion in Step S102 to be described later; variations (d) calculated in Step S103 to be described later; and fingerprints (e) created in Step S110 and Step S120.

First, the image frames (a) in FIG. 9 show an example when 9 image frames A001 to A009 are extracted from the video content in Step S1 shown in FIG. 6. In the example shown in FIG. 9, each of image frames A001 to A009 is included in any of 3 scenes which are a first scene to a third scene. Image frames A001 to A003 are included in the first scene, image frames A004 to A006 are included in the second scene, and image frames A007 to A009 are included in the third scene. Image frames A001 to A009 are so-called color images, and include color information.

Next, the image frames (b) in FIG. 9 show an example when each of 9 image frames A001 to A009 extracted in Step S1 of FIG. 6 is subjected to the gray scale conversion in Step S101 of FIG. 10 to be described later. In such a way, the color information included in image frames A001 to A009 is converted into the brightness value for each of the pixels.

Next, the image frames (c) in FIG. 9 show an example when each of 9 image frames A001 to A009 subjected to the gray scale conversion in Step S101 of FIG. 10 to be described later is subjected to the down scale conversion in Step S102 of FIG. 10 to be described later. In such a way, the number of pixels which compose the image frames is reduced. Note that the image frames (c) in FIG. 9 show an example when a single image frame is divided into 25 blocks as a product of 5 blocks by 5 blocks. This can be translated that the number of pixels which compose a single image frame is downscaled to 25. A brightness value of each of the blocks shown in the image frames (c) of FIG. 9 is calculated from brightness values of the plurality of pixels which compose each block. The brightness value of each block can be calculated by calculating, for each of the blocks, an average value, intermediate value or the like of the brightness values of the plurality of pixels which compose the block.

Note that, in the image frames (c) of FIG. 9, a gray scale of each block corresponds to a magnitude of the brightness value. As the brightness value is larger, the block is shown to be darker, and as the brightness value is smaller, the block is shown to be lighter.

Next, the variations (d) in FIG. 9 show an example when 8 image-changed frames B001 to B008 are created in Step S103 of FIG. 10, which is to be described later, from 9 image frames A001 to A009 subjected to the down scale conversion in Step S102 of FIG. 10 to be described later. In Step S103, the variation of the brightness value (that is, the brightness-changed value) is calculated between two temporally adjacent image frames, whereby a single image-changed frame is created. In Step S103, for example, image-changed frame B001 is created from image frame A001 and image frame A002, which are subjected to the down scale conversion.

Note that, in the variations (d) of FIG. 9, the gray scale of each block which composes each image-changed frame corresponds to the brightness-changed value of the image-changed frame, that is, to the variation of the brightness value between two image frames subjected to the down scale conversion. As the variation of the brightness value is larger, the block is shown to be darker, and as the variation of the brightness value is smaller, the block is shown to be lighter.

Next, the fingerprints (e) in FIG. 9 show an example when totally 5 static fingerprints and dynamic fingerprints are created from 8 image-changed frames B001 to B008 created in Step S103 of FIG. 10 to be described later.

In the example shown in FIG. 9, both of image-changed frame B001 and image-changed frame B002 are created from image frames A001 to A003 included in the same scene. Therefore, image-changed frame B001 is similar to image-changed frame B002. Hence, in Step S110, one static fingerprint C002 can be created from image-changed frame B001 and image-changed frame B002. The same also applies to image-changed frame B004 and image-changed frame B005, and to image-changed frame B007 and image-changed frame B008.

Meanwhile, in the example shown in FIG. 9, image-changed frame B003 is created from two image frames A003, A004 between which the scene is switched. Hence, in Step S120, one dynamic fingerprint D003 can be created from image-changed frame B003. The same also applies to image-changed frame B006.

In the example shown in FIG. 9, the fingerprints of the video content, which are created from image frames A001 to A009 as described above, include 3 static fingerprints C002, C005, C008, and 2 dynamic fingerprints D003, D006.

As described above, the created fingerprints of the video content include at least two of one or more static fingerprints and one or more dynamic fingerprints. The fingerprints of the video content may be composed of only two or more static fingerprints, may be composed of only two or more dynamic finger prints, or may be composed of one or more static fingerprints and one or more dynamic fingerprints.

Note that, in the fingerprints (e) of FIG. 9, the gray scale of each block which composes the static fingerprint or the dynamic fingerprint corresponds to the magnitude of the brightness value of the block.

[1-4-4. Scale Conversion and Calculation of Variation]

Next, details of the processing at the time of calculating the variation between the image frames in this exemplary embodiment are described with reference to FIG. 10 to FIG. 12.

Figure 10:
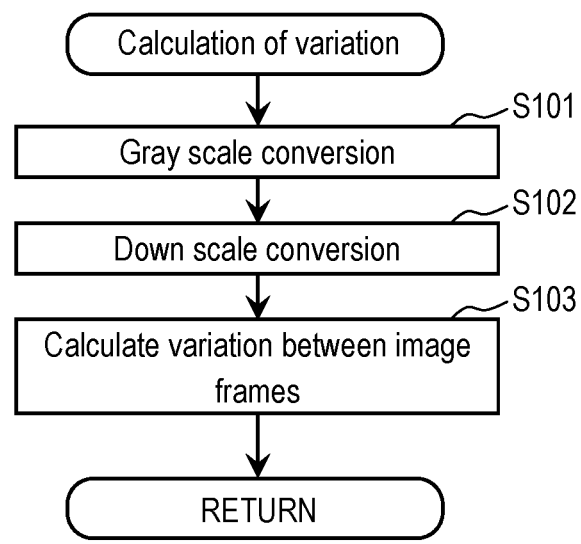
FIG. 10 is a flowchart showing an example of processing for calculating a variation between the image frames in the first exemplary embodiment.

FIG. 10 is a flowchart showing an example of the processing for calculating the variation between the image frames in the first exemplary embodiment. The flowchart of FIG. 10 shows an overview of the processing executed in Step S100 of FIG. 8.

Figure 11:
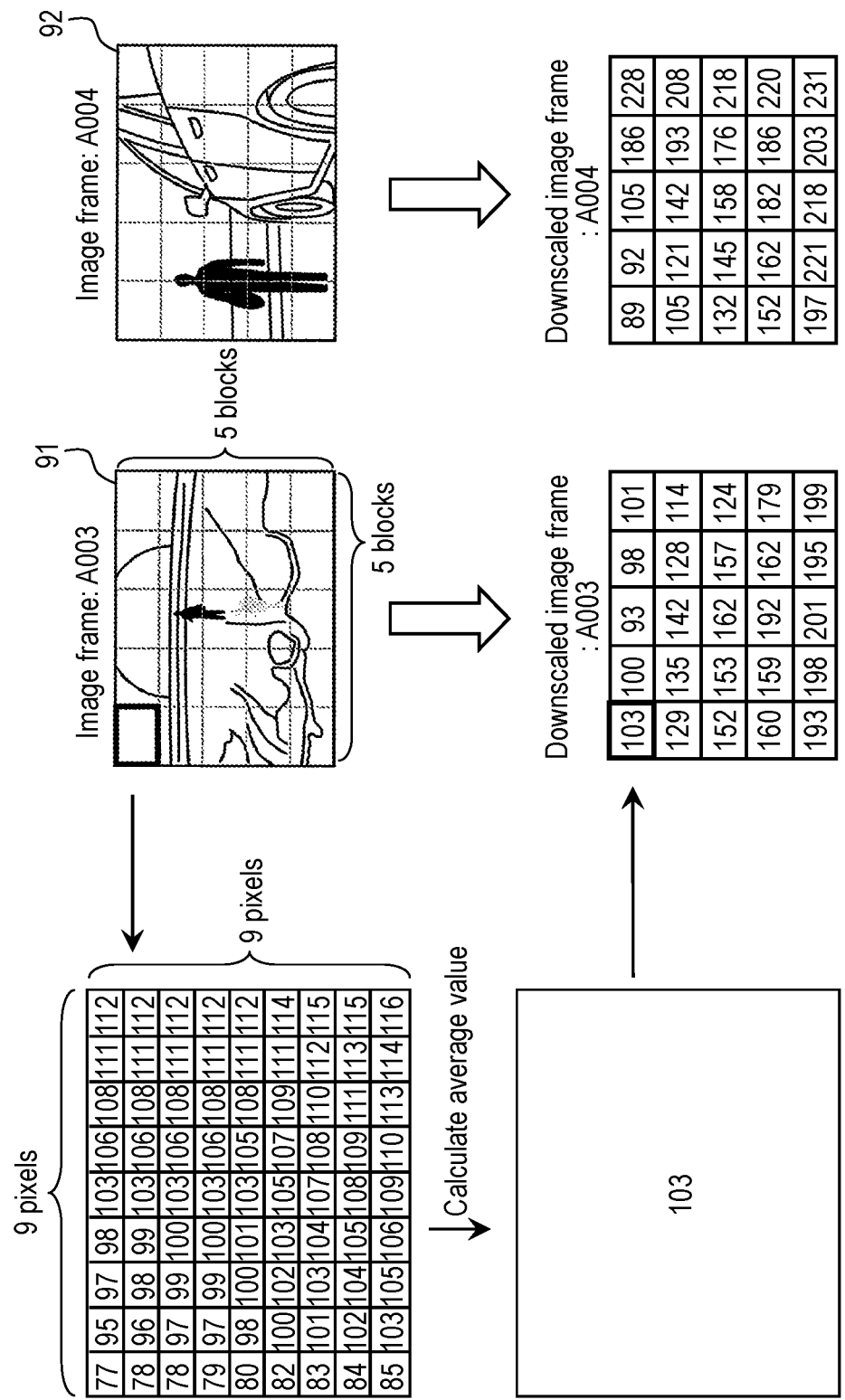
FIG. 11 is a view schematically showing an example of down scale conversion processing for the image frames in the first exemplary embodiment.

FIG. 11 is a view schematically showing an example of down scale conversion processing for the image frames in the first exemplary embodiment.

Figure 12:
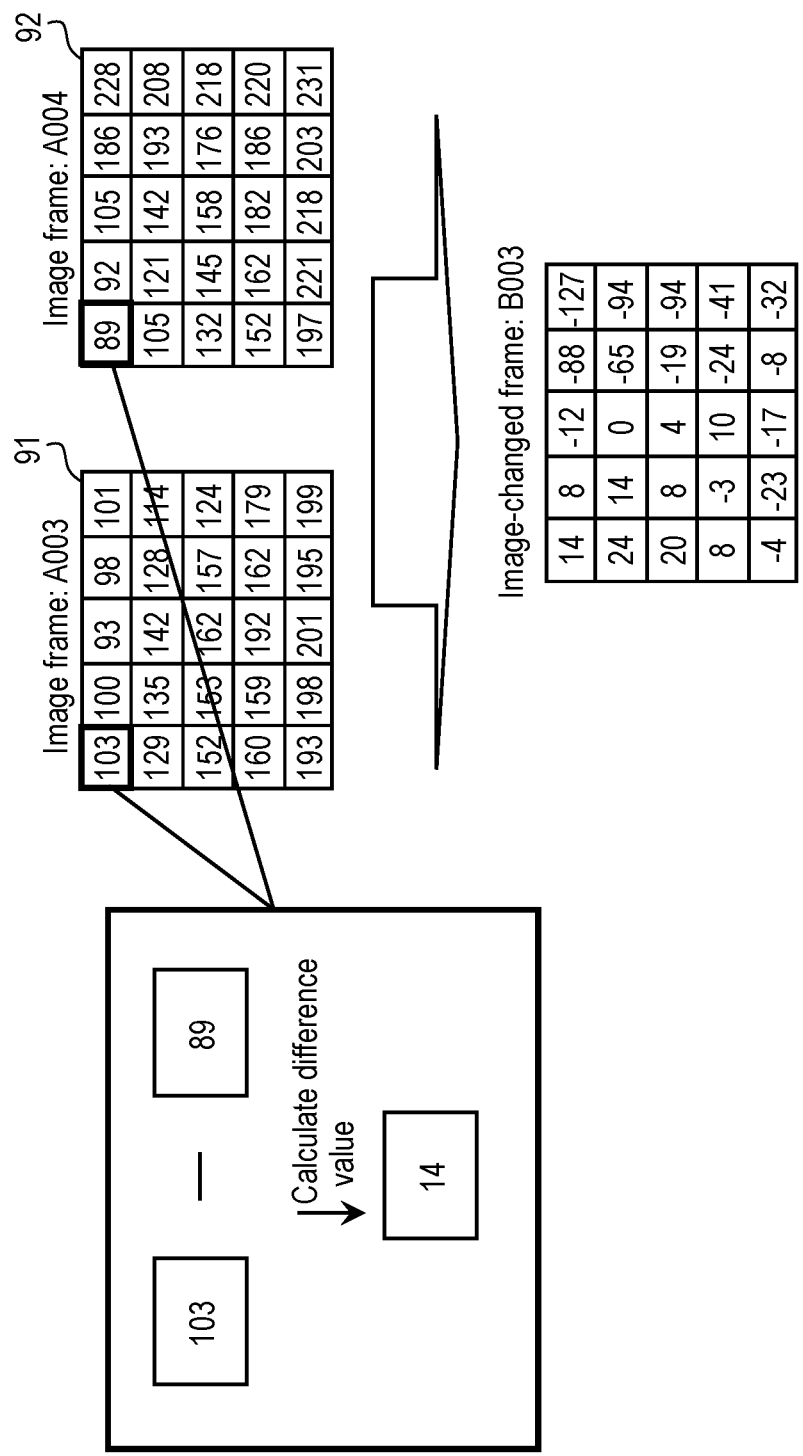
FIG. 12 is a view schematically showing an example of the processing for calculating the variation between the image frames in the first exemplary embodiment.

FIG. 12 is a view schematically showing an example of the processing for calculating the variation between the image frames in the first exemplary embodiment.

The flowchart of FIG. 10 is described. First, scale converter 210 shown in FIG. 5 performs the gray scale conversion for the plurality of extracted image frames (Step S101).

Scale converter 210 individually converts one of the plurality of extracted image frames and an image frame, which is temporally adjacent to the image frame, into gray scales. Note that, in this exemplary embodiment, the extracted one image frame is defined as "frame 91", and the image frame temporally adjacent to frame 91 is defined as "frame 92". Scale converter 210 converts color information of frames 91, 92 into brightness values, for example, based on the NTSC-system weighted average method.

Note that, in this exemplary embodiment, an image frame immediately after frame 91 is defined as frame 92. However, the present disclosure is never limited to this configuration. Frame 92 may be an image frame immediately before frame 91. Alternatively, frame 92 may be an image frame that is a third or more to frame 91, or may be an image frame that is a third or more from frame 91.

Next, scale converter 210 performs the down scale conversion for the two image frames subjected to the gray scale conversion (Step S102).

FIG. 11 shows an example of performing the down scale conversion for image frames A003, A004. In the example shown in FIG. 11, image frame A003 corresponds to frame 91, and image frame A004 corresponds to frame 92.

For example, as shown in FIG. 11, scale converter 210 divides image frame A003 into 25 blocks as a product of 5 blocks by 5 blocks. In the example shown in FIG. 11, it is assumed that each of the blocks includes 81 pixels as a product of 9 pixels by 9 pixels. For example, as shown in FIG. 11, an upper left block of image frame A003 is composed of 81 pixels having brightness values such as "77", "95", and so on. Note that these numeric values are merely an example, and the present disclosure is never limited to these numeric values.

For example, for each of the blocks, scale converter 210 calculates an average value of the brightness values of the plurality of pixels included in each block, and thereby calculates a brightness value representing the block. In the example shown in FIG. 11, an average value of the brightness values of 81 pixels which compose the upper left block of image frame A003 is calculated, whereby a value "103" is calculated. The value (average value) thus calculated is a brightness value representing the upper left block. In such a manner as described above, with regard to each of all the blocks which compose image frame A003, scale converter 210 calculates the brightness value representing each block.

In such a way, the number of pixels which compose the image frame can be converted into the number of blocks (that is, can be downscaled). In the example shown in FIG. 11, an image frame having 45 pixels×45 pixels is subjected to the down scale conversion into an image frame composed of 25 blocks as a product of 5 blocks by 5 blocks. This can be translated that the image frame having 45 pixels×45 pixels is subjected to the down scale conversion into the image frame having 5 pixels by 5 pixels.

In the example shown in FIG. 11, image frame A003 already subjected to such down scale conversion is composed of 25 blocks including the average values such as "103", "100", and so on. This may be translated that image frame A003 already subjected to the down scale conversion is composed of 25 pixels having the brightness values such as "103", "100", and so on. Image frame A004 is also subjected to the down scale conversion in a similar way. Note that, in this exemplary embodiment, each block that composes the image frame already subjected to the down scale conversion is sometimes expressed as a "pixel", and the average value of the brightness calculated for each of the blocks is sometimes expressed as a "brightness value of the pixel of the image frame already subjected to the down scale conversion".

Next, difference calculator 220 shown in FIG. 5 calculates differences of the brightness values between frame 91 and frame 92, which are already subjected to the down scale conversion, and creates the image-changed frame composed of the differences of the brightness values (that is, brightness-changed values) (Step S103).

For example, in the example shown in FIG. 12, difference calculator 220 individually calculates differences between the brightness values of the respective pixels which compose frame 91 already subjected to the down scale conversion and the brightness values of the respective pixels which compose fame 92 already subjected to the down scale conversion. At this time, difference calculator 220 calculates each difference of the brightness value between pixels located at the same position. For example, difference calculator 220 subtracts the upper left brightness value "89" of image frame A004 from the upper left brightness value "103" of image frame A003, and calculates the upper left brightness-changed value "14" of image-changed frame B003.

In such a manner as described above, difference calculator 220 calculates the differences of the brightness values for all of the pixels (that is, all of the blocks) between the two image frames already subjected to the down scale conversion, and creates the image-changed frames. In the example shown in FIG. 12, image-changed frame B003 is created from image frames A003, A004 already subjected to the down scale conversion.

[1-4-5. Creation of Static Fingerprint]

Next, details of the processing at the time of creating the static fingerprint in this exemplary embodiment are described with reference to FIG. 13, FIG. 14.

Figure 13:
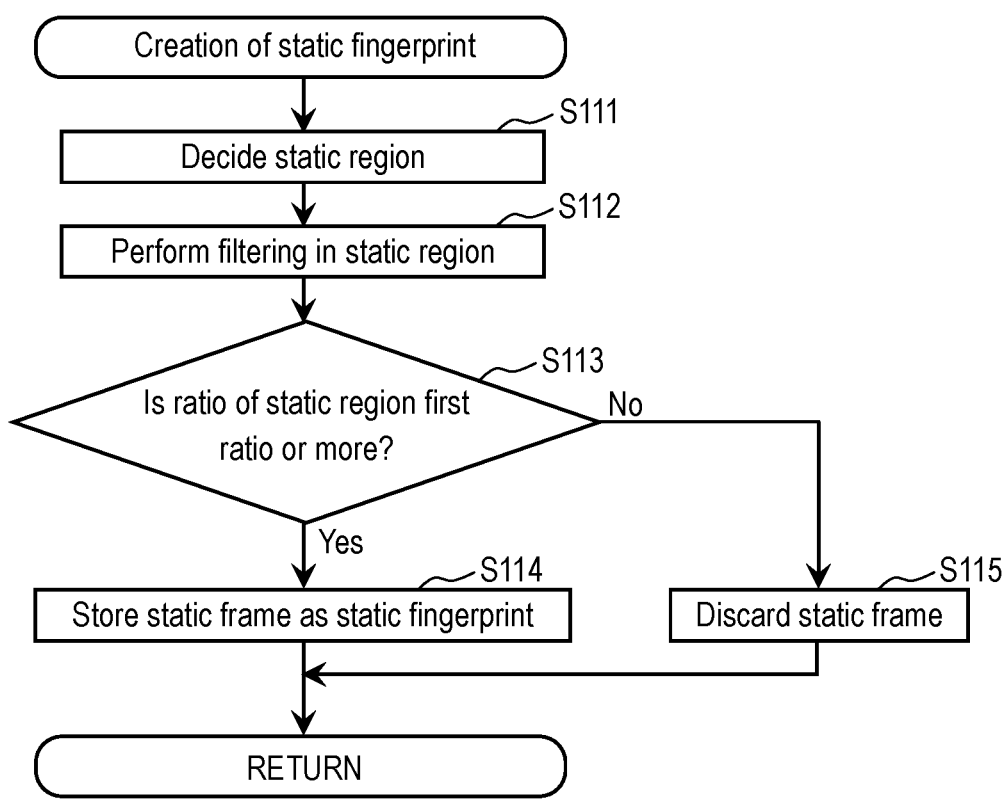
FIG. 13 is a flowchart showing an example of processing for creating a static fingerprint in the first exemplary embodiment.

FIG. 13 is a flowchart showing an example of the processing for creating the static fingerprint in the first exemplary embodiment. The flowchart of FIG. 13 shows an overview of the processing executed in Step S110 of FIG. 8.

Figure 14:
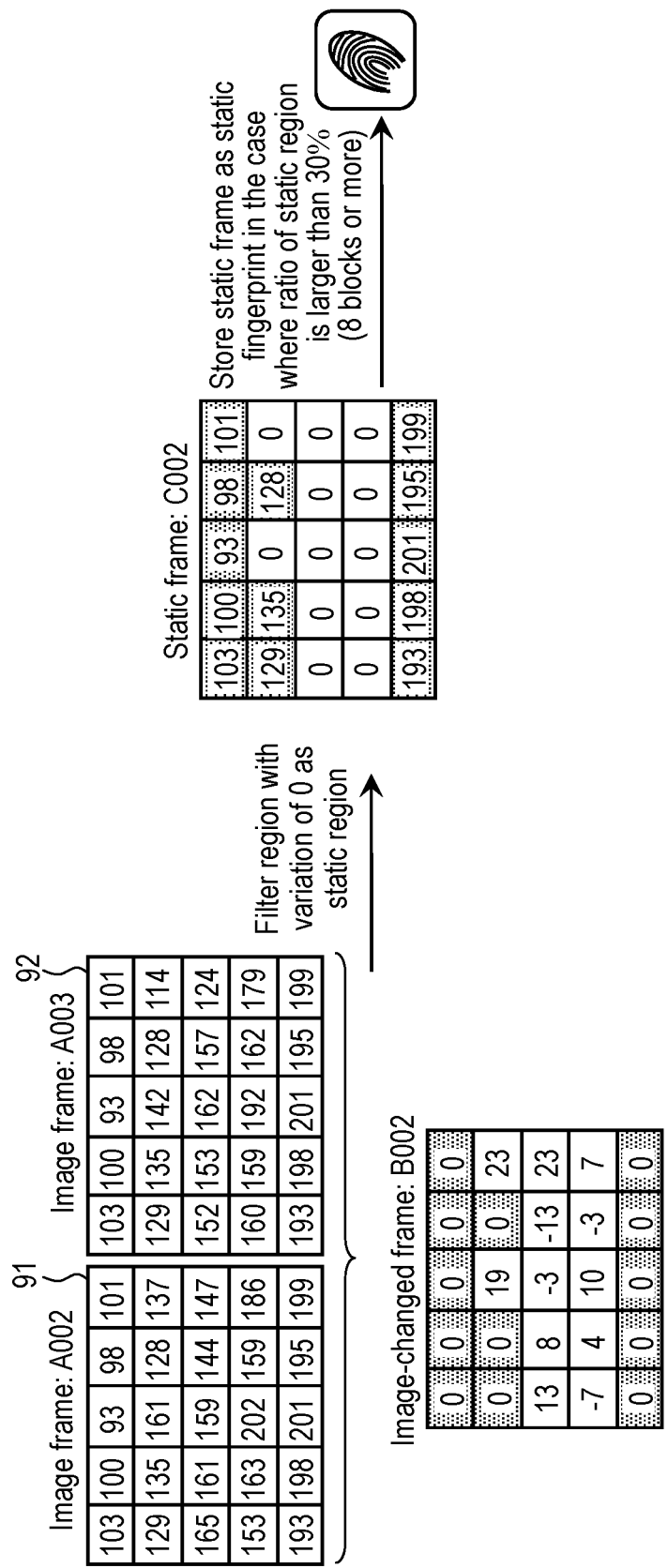
FIG. 14 is a view schematically showing an example of a static fingerprint created based on the variation between the image frames in the first exemplary embodiment.

FIG. 14 is a view schematically showing an example of the static fingerprint created based on the variations between the image frames in the first exemplary embodiment.

First, static region decision part 231 shown in FIG. 5 decides the static regions (Step S111).

Static region decision part 231 calculates the absolute values of the brightness-changed values of the image-changed frames, and compares the absolute values with the first threshold. Then, static region decision part 231 determines whether or not the absolute values of the brightness-changed values are smaller than the first threshold, and defines, as the static regions, the regions in which the absolute value of the brightness-changed values are smaller than the first threshold. In such a way, the static regions are decided. Such an absolute value of each brightness-changed value is the variation of the brightness value between two temporally adjacent image frames.

For example, if the first threshold is set at "1", then static region decision part 231 defines, as the static region, the region in which the brightness-changed value of the image-changed frame is "0", that is, the region in which the brightness value is not substantially changed between two temporally adjacent image frames. In a case of this setting, in the example shown in FIG. 14, 13 blocks represented by "0" as the brightness-changed value in image-changed frame B002 serve as the static regions.

Next, static fingerprint creation part 241 shown in FIG. 5 filters frame 91 in the static regions decided in Step S111, and creates the static frame (Step S112).

This filtering refers to that the following processing is implemented for the brightness values of the respective blocks which compose frame 91. With regard to the static regions decided in Step S111, the brightness values of the blocks of frame 91, which correspond to the static regions, are used as they are, and with regard to the blocks other than the static regions, the brightness values thereof are set to a fixed value (for example, "0").

In the example shown in FIG. 14, the static frame created by filtering frame 91 is static frame C002. In static frame C002, with regard to the blocks (static regions) in which the brightness-changed values are "0" in image-changed frame B002, the brightness values of frame 91 are used as they are, and with regard to the blocks other than the static regions, the brightness values thereof are "0".

Next, static fingerprint creation part 241 calculates a ratio of the static regions decided in Step S111, compares the calculated ratio with the first ratio, and determines whether or not the ratio of the static regions is the first ratio or more (Step S113).

Static fingerprint creation part 241 calculates the ratio of the static regions based on the number of blocks, which are determined to be the static regions in Step S111, with respect to a total number of blocks which compose the image-changed frame. In the example of image-changed frame B002 shown in FIG. 14, the total number of blocks which compose the image-changed frame is 25, and the number of blocks of the static regions is 13, and accordingly, the ratio of the static regions is 52%. Hence, if the first ratio is, for example, 30%, then in the example shown in FIG. 14, a determination of Yes is made in Step S113.

In a case where it is determined in Step S113 that the ratio of the static regions is the first ratio or more (Yes in Step S113), static fingerprint creation part 241 stores the static frame, which is created in Step S112, as a static fingerprint (Step S114).

In the example shown in FIG. 14, in the case where the determination of Yes is made in Step S113, static frame C002 is stored as static fingerprint C002 in a storage device (for example, an internal memory and the like of image recognizer 100, not shown) of reception device 10.

In a case where it is determined in Step S113 that the ratio of the static regions is less than the first ratio (No in Step S113), static fingerprint creation part 241 does not store but discards the static frame, which is created in Step S112 (Step S115). Hence, in the case where the determination of No is made in Step S113, the static fingerprint is not created.

Note that, in the flowchart of FIG. 13, the description is made of the operation example where the determination as to whether or not to store the static frame is made in Step S113 after the static frame is created by performing the filtering in Step S112; however, the present disclosure is never limited to this processing order. For example, the order of the respective pieces of processing may be set so that Step S113 can be executed after the static regions are decided in Step S111, that Step S112 can be executed to create the static frame when the determination of Yes is made in Step S113, and that the static frame can be stored as the static fingerprint in Step S114 that follows.

[1-4-6. Creation of Dynamic Fingerprint]

Next, details of the processing at the time of creating the dynamic fingerprint in this exemplary embodiment are described with reference to FIG. 15, FIG. 16A, FIG. 16B.

Figure 15:
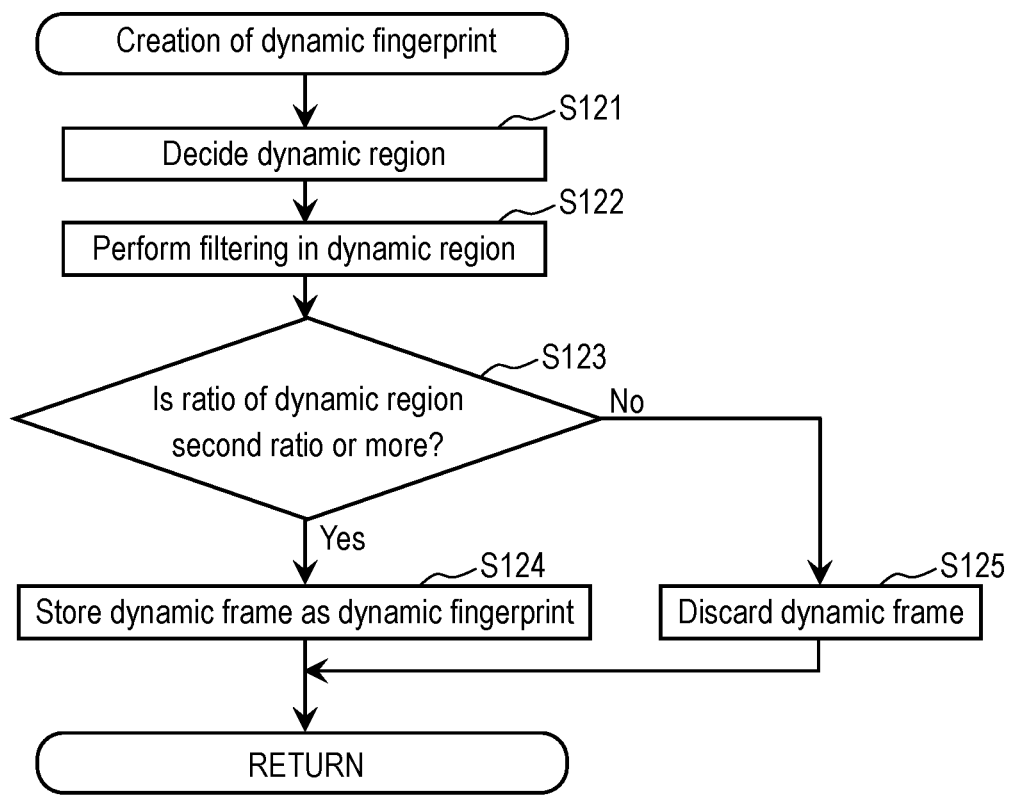
FIG. 15 is a flowchart showing an example of processing for creating a dynamic fingerprint in the first exemplary embodiment.

FIG. 15 is a flowchart showing an example of processing for creating the dynamic fingerprint in the first exemplary embodiment.

Figure 16A:
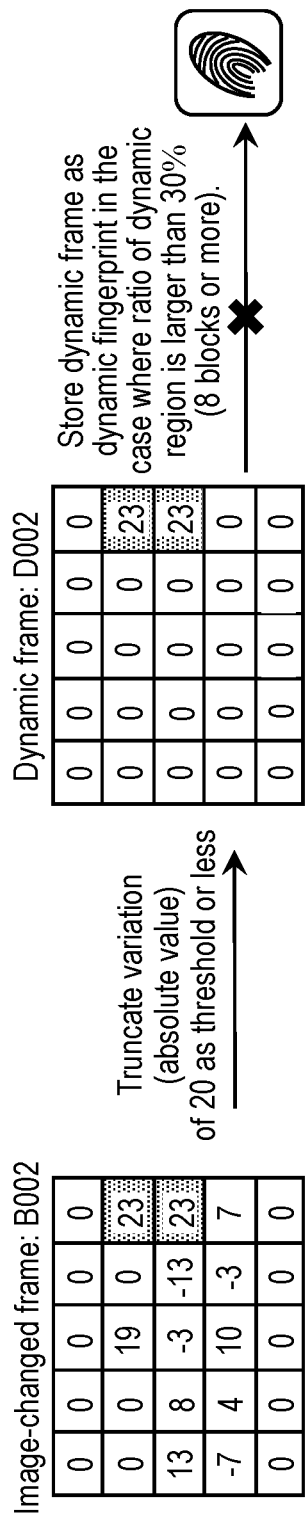
FIG. 16A is a view schematically showing an example of an image frame from which the dynamic fingerprint in the first exemplary embodiment is not created.

FIG. 16A is a view schematically showing an example of an image frame from which the dynamic fingerprint in the first exemplary embodiment is not created.

Figure 16B:
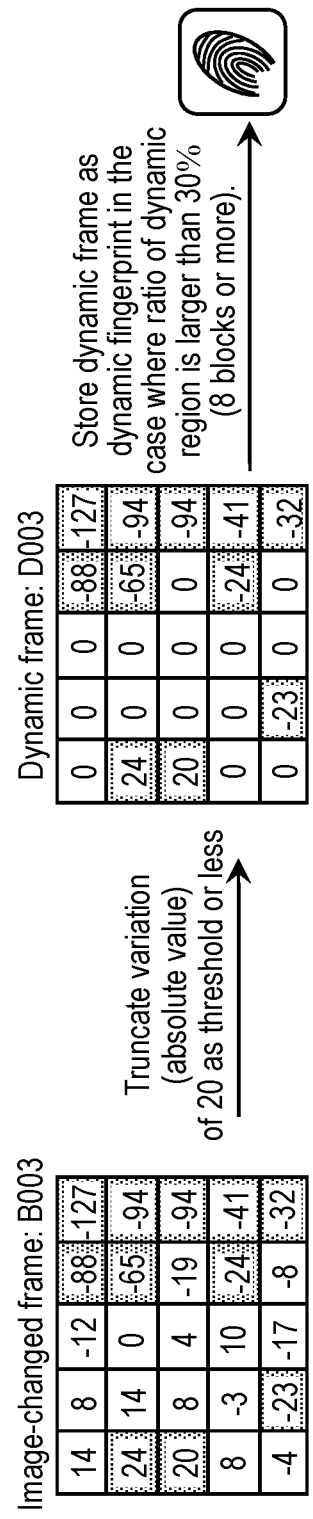
FIG. 16B is a view schematically showing an example of a dynamic fingerprint created based on the variation between the image frames in the first exemplary embodiment.

FIG. 16B is a view schematically showing an example of the dynamic fingerprint created based on the variation between the image frames in the first exemplary embodiment.

First, dynamic region decision part 232 shown in FIG. 5 decides the dynamic region (Step S121).

Dynamic region decision part 232 calculates the absolute values of the brightness-changed values of the image-changed frames, and compares the absolute values with the second threshold. Then, dynamic region decision part 232 determines whether or not the absolute values of the brightness-changed values are larger than the second threshold, and defines, as the dynamic region, the region in which the absolute value of the brightness-changed value is larger than the second threshold. In such a way, the dynamic region is decided.

For example, if the second threshold is set at "20", then a block in which the absolute value of the brightness-changed value is "21" or more in the image-changed frame serves as the dynamic region. In a case of this setting, in an example shown in FIG. 16A, two blocks represented by a numeric value of "21" or more or "−21" or less as a brightness-changed value in image-changed frame B002 serve as the dynamic regions, and in an example shown in FIG. 16B, 11 blocks represented by the numeric value of "21" or more or "−21" or less as the brightness-changed value in image-changed frame B003, serve as the dynamic regions.

Next, dynamic fingerprint creation part 242 shown in FIG. 5 filters the image-changed frame in the dynamic regions decided in Step S121, and creates the dynamic frame (Step S122).

This filtering refers to that the following processing is implemented for the brightness-changed values of the respective blocks which compose the image-changed frame. With regard to the dynamic regions decided in Step S121, the brightness-changed values of the blocks, which correspond to the dynamic regions, are used as they are, and with regard to the blocks other than the dynamic regions, the brightness-changed values thereof are set to a fixed value (for example, "0").

The dynamic frame created by filtering the image-changed frame is dynamic frame D002 in the example shown in FIG. 16A, and is dynamic frame D003 in the example shown in FIG. 16B. In dynamic frames D002, D003, with regard to the blocks (dynamic regions), in each of which the brightness-changed value is "21" or more or "−21" or less in image-changed frames B002, B003, the brightness-changed values of image-changed frames B002, B003 are used as they are, and with regard to the blocks other than the dynamic regions, the brightness-changed values thereof are "0".

Note that the processing of Step S121, Step S122 for the image-changed frame can be executed, for example, by batch processing for substituting "0" for the brightness-changed value of the block in which the absolute value of the brightness-changed value is the second threshold or less.

Next, dynamic fingerprint creation part 242 calculates a ratio of the dynamic regions decided in Step S121, compares the calculated ratio with the second ratio, and determines whether or not the ratio of the dynamic regions is the second ratio or more (Step S123).

Dynamic fingerprint creation part 242 calculates the ratio of the dynamic regions based on the number of blocks, which are determined to be the dynamic regions in Step S121, with respect to the total number of blocks which compose the image-changed frame. In the example of image-changed frame B002 shown in FIG. 16A, the total number of blocks which compose the image-changed frame is 25, and the number of blocks of the dynamic regions is 2, and accordingly, the ratio of the dynamic regions is 8%. In the example of image-changed frame B003 shown in FIG. 16B, the total number of blocks which compose the image-changed frame is 25, and the number of blocks of the dynamic regions is 11, and accordingly, the ratio of the dynamic regions is 44%. Hence, if the second ratio is 30% for example, then the determination of No is made in Step S123 in the example shown in FIG. 16A, and the determination of Yes is made in Step S123 in the example shown in FIG. 16B.

In a case where it is determined in Step S123 that the ratio of the dynamic regions is the second ratio or more (Yes in Step S123), dynamic fingerprint creation part 242 stores the dynamic frame, which is created in Step S122, as a dynamic fingerprint (Step S124).

Meanwhile, in a case where it is determined that the ratio of the dynamic regions is less than the second ratio (No in Step S123), dynamic fingerprint creation part 242 does not store but discards the dynamic frame, which is created in Step S122 (Step S125). Hence, in the case where the determination of No is made in Step S123, the dynamic fingerprint is not created.

In the example shown in FIG. 16B, dynamic frame D003 for which the determination of Yes is made in Step S123 is stored as dynamic fingerprint D003 in the storage device (for example, an internal memory and the like of image recognizer 100, not shown) of reception device 10.

In the example shown in FIG. 16A, dynamic frame D002 for which the determination of No is made in Step S123 is not stored but discarded.

Note that, in the flowchart of FIG. 15, the description is made of the operation example where the determination as to whether or not to store the dynamic frame is made in Step S123 after the dynamic frame is created by performing the filtering in Step S122; however, the present disclosure is never limited to this processing order. For example, the order of the respective pieces of processing may be set so that Step S123 is executed after the dynamic regions are decided in Step S121, that Step S122 is executed to create the dynamic frame when the determination of Yes is made in Step S123, and that the dynamic frame is stored as the dynamic fingerprint in Step S124 that follows.

[1-4-7. Frame Sequential Recognition Data Correlation]

Next, with reference to FIG. 17 to FIG. 21, a description is made of details of the processing at a time of executing the collation of the recognition data in this exemplary embodiment.

Figure 17:
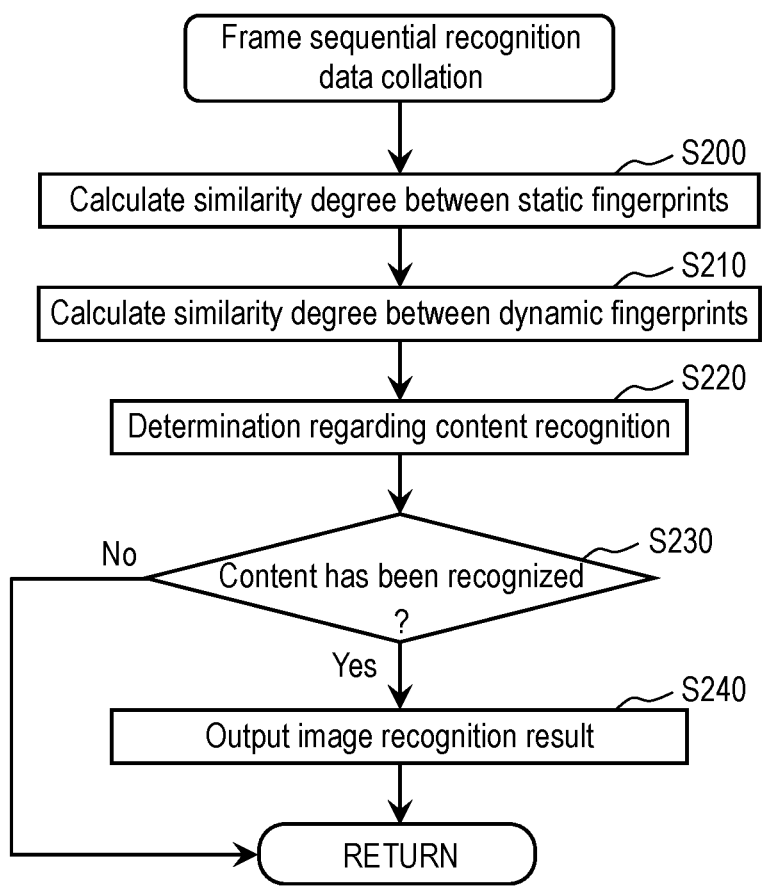
FIG. 17 is a flowchart showing an example of processing for collating the recognition data in the first exemplary embodiment.

FIG. 17 is a flowchart showing an example of processing for collating the recognition data in the first exemplary embodiment. The flowchart of FIG. 17 shows an overview of the processing executed in Step S20 of FIG. 7.

FIG. 18 is a view schematically showing an example of processing for collating the static fingerprint in the first exemplary embodiment.

FIG. 19 is a view schematically showing an example of processing for collating the dynamic fingerprint in the first exemplary embodiment.

FIG. 20 is a view showing an example of recognition conditions for the video content in the first exemplary embodiment. FIG. 20 shows 5 recognition conditions (a) to (e) as an example.

Figure 21:
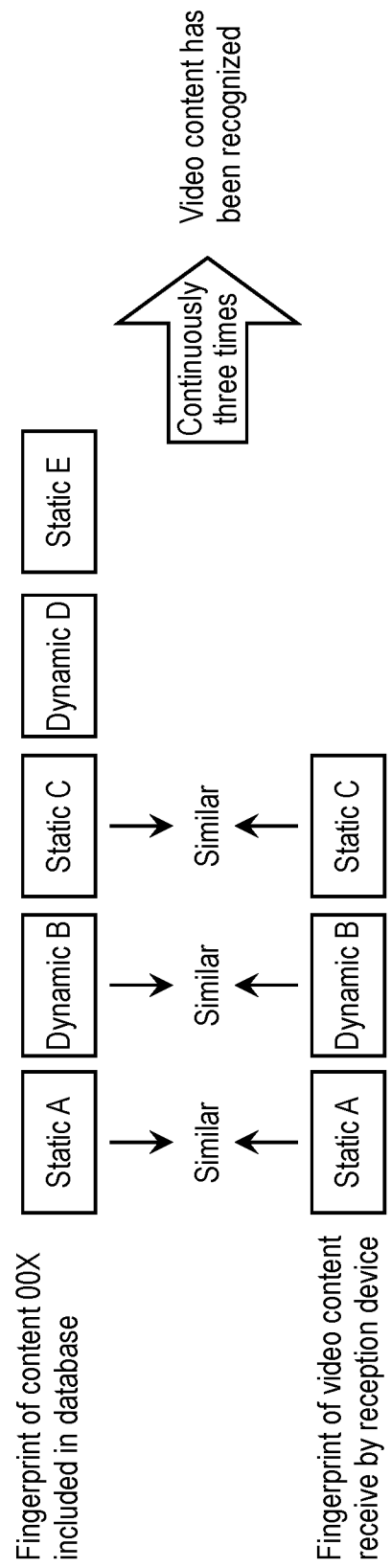
FIG. 21 is a view schematically showing an example of processing for collating the video content in the first exemplary embodiment.

FIG. 21 is a view schematically showing an example of the processing for collating the video content in the first exemplary embodiment.

[1-4-7-1. Similarity Degree Between Static Fingerprints]

The flowchart of FIG. 17 is described. Collator 130 shown in FIG. 1 and FIG. 2 calculates a similarity degree between the static fingerprints (Step S200).

Collator 130 collates the static fingerprint, which is included in the fingerprint created in fingerprint creator 110, with the static fingerprint (hereinafter, also referred to as a "static fingerprint included in the database") included in each of the plurality of fingerprints acquired from server device 20 by fingerprint acquirer 120. Then, collator 130 calculates a similarity degree between the static fingerprint, which is created in fingerprint creator 110, and each of the plurality of static fingerprints included in the database. Note that the plurality of fingerprints acquired from server device 20 are the fingerprints accumulated in fingerprint DB 22 of server device 20.

Collator 130 calculates, as the similarity degree, a degree of coincidence between the static regions. Specifically, collator 130 compares the position of the static region of the static fingerprint, which is created in fingerprint creator 110, with the position of the static region of each of the static fingerprints acquired by fingerprint acquirer 120. Then, collator 130 counts the number of regions (blocks), in which both coincide with each other, and calculates, as the similarity degree, an occupation ratio of the regions where both coincide with each other with respect to the static fingerprint.

Note that, in this exemplary embodiment, it is defined that whether or not both coincide with each other is determined based only on whether or not the region is the static region, and that the brightness values of the respective blocks are not considered. If blocks located at the same position are the static regions, then collator 130 determines that both coincide with each other even if the brightness values of the individual blocks are different from each other.

An example of processing for calculating the similarity degree, which is performed in collator 130, is described with reference to a specific example in FIG. 18.

Static fingerprint C002 shown in FIG. 18 is a static fingerprint created in fingerprint creator 110. Moreover, static fingerprint C00X shown in FIG. 18 is a static fingerprint acquired from server device 20 by fingerprint acquirer 120. Note that, in FIG. 18, static fingerprint C002 is referred to as "static fingerprint included in recognition data", and static fingerprint C00X is referred to as "static fingerprint included in database".

In an example shown in FIG. 18, both of the number of blocks of the static regions of static fingerprint C002 and of the number of blocks of the static regions of static fingerprint C00X are 13 that is the same number. However, the blocks are a little different in position. Those in which the positions of the blocks of the static regions coincide with each other between static fingerprint C002 and static fingerprint C00X are totally 11 blocks, which are 5 blocks on a first row from the top, 1 block (block with a brightness value of "128") on a second row from the top, and 5 blocks on a fifth row from the top among 25 blocks in each of the static fingerprints. Here, the total number of blocks which compose the static fingerprint is 25, and accordingly, collator 130 calculates 11/25=44%, and sets the calculated 44% as the similarity degree between static fingerprint C002 and static fingerprint C00X.

Then, collator 130 compares the calculated similarity degree with a predetermined static threshold, and performs a similarity determination based on a result of this comparison. Collator 130 makes a determination of "being similar" if the calculated similarity degree is the static threshold or more, and makes a determination of "not being similar" if the calculated similarity degree is less than the static threshold. In the above-mentioned example, if the static threshold is set at 40% for example, then collator 130 determines that static fingerprint C002 is similar to static fingerprint C00X. Note that a numeric value of this static threshold is merely an example, and desirably, is set as appropriate.

Note that, in this exemplary embodiment, it is described that the brightness values of the respective blocks which compose the static fingerprints are not considered for calculation of the similarity degree between the static fingerprints; however, the present disclosure is never limited to this configuration. Collator 130 may use the brightness values of the respective blocks composing the static fingerprints for calculation of the similarity degree between the static fingerprints. For example, for collating two static fingerprints with each other, collator 130 may calculate the similarity degree between the static fingerprints by counting the number of blocks in which not only the positions but also the brightness values coincide with each other. Alternatively, collator 130 may calculate the similarity degree between the static fingerprints by using the normalized cross correlation.

[1-4-7-2. Similarity Degree Between Dynamic Fingerprints]

Next, collator 130 calculates a similarity degree between the dynamic fingerprints (Step S210).

Collator 130 collates the dynamic fingerprint, which is included in the fingerprint created in fingerprint creator 110, with the dynamic fingerprint (hereinafter, also referred to as a "dynamic fingerprint included in the database") included in each of the plurality of fingerprints acquired from server device 20 by fingerprint acquirer 120. Then, collator 130 calculates a similarity degree between the dynamic fingerprint, which is created in fingerprint creator 110, and each of the plurality of dynamic fingerprints included in the database.

Collator 130 calculates, as the similarity degree, a degree of coincidence between the dynamic regions. Specifically, collator 130 compares the positions of the dynamic regions and signs of the brightness-changed values in the dynamic fingerprints, which are created in fingerprint creator 110, with the positions of the dynamic regions and signs of the brightness-changed values in the dynamic fingerprints, which are acquired from fingerprint acquirer 120. Then, collator 130 counts the number of regions (blocks), in which both coincide with each other, and calculates, as the similarity degree, an occupation ratio of the regions where both coincide with each other with respect to the dynamic fingerprint.

Note that, in this exemplary embodiment, it is defined that whether or not both coincide with each other is determined based on whether or not the regions are the dynamic regions, and based on the signs of the brightness-changed values, and that the numeric values of the brightness-changed value of the respective blocks are not considered. If blocks located at the same position are the dynamic regions, and the signs of the brightness-changed values are mutually the same, then collator 130 determines that both coincide with each other even if the numeric values of the brightness-changed value of the individual blocks are different from each other.

An example of processing for calculating the similarity degree, which is performed in collator 130, is described with reference to a specific example in FIG. 19.

Dynamic fingerprint D003 shown in FIG. 19 is a dynamic fingerprint created in fingerprint creator 110. Moreover, dynamic fingerprint D00X shown in FIG. 19 is a dynamic fingerprint acquired from server device 20 by fingerprint acquirer 120. Note that, in FIG. 19, dynamic fingerprint D003 is referred to as "dynamic fingerprint included in recognition data", and dynamic fingerprint D00X is referred to as "dynamic fingerprint included in database".

In an example shown in FIG. 19, the number of blocks of the dynamic regions of dynamic fingerprint D003 is 11, and the number of blocks of the dynamic regions of dynamic fingerprint D00X is 8. Then, those in which the positions of the blocks and the signs of the brightness-changed values in the dynamic regions coincide with each other between dynamic fingerprint D003 and dynamic fingerprint D00X are totally 5 blocks, which are 2 blocks on a first row from the top, 2 blocks on a second row from the top, and 1 block on a fifth row from the top among 25 blocks in each of the dynamic fingerprints. Here, the total number of blocks which compose the dynamic fingerprint is 25, and accordingly, collator 130 calculates 5/25=20%, and sets the calculated 20% as the similarity degree between dynamic fingerprint D003 and dynamic fingerprint D00X.

Then, collator 130 compares the calculated similarity degree with a predetermined dynamic threshold, and performs a similarity determination based on a result of this comparison. Collator 130 makes a determination of "being similar" if the calculated similarity degree is the dynamic threshold or more, and makes a determination of "not being similar" if the calculated similarity degree is less than the dynamic threshold. In the above-mentioned example, if the dynamic threshold is set at 30% for example, then collator 130 determines that dynamic fingerprint D003 is not similar to dynamic fingerprint D00X.

Note that a numeric value of this dynamic threshold is merely an example, and desirably, is set as appropriate. Moreover, the above-mentioned static threshold and this dynamic threshold may be set at the same numeric value, or may be set at different numeric values.

As described above, collator 130 individually executes the similarity determination regarding the static fingerprints, which is based on the similarity degree calculated in Step S200, and the similarity determination regarding the dynamic fingerprints, which is based on the similarity degree calculated in Step S210.

Note that, in this exemplary embodiment, it is described that magnitudes of the brightness-changed values of the respective blocks which compose the dynamic fingerprints are not considered for calculation of the similarity degree between the dynamic fingerprints; however, the present disclosure is never limited to this configuration. Collator 130 may use the absolute values of the brightness-changed values of the respective blocks composing the dynamic fingerprints for calculation of the similarity degree between the dynamic fingerprints. For example, for collating two dynamic fingerprints with each other, collator 130 may calculate the similarity degree between the dynamic fingerprints by counting the number of blocks in which the absolute values of the brightness-changed values also coincide with each other in addition to the positions and the signs. Alternatively, as in the case of calculating the similarity degree between the static fingerprints, collator 130 may calculate the similarity degree between the dynamic fingerprints by using only the positions of the blocks of the dynamic regions. Alternatively, collator 130 may calculate the similarity degree between the dynamic fingerprints by using the normalized cross correlation.

Note that either of the processing for calculating the similarity degree between the static fingerprints in Step S200 and the processing for calculating the similarity degree between the dynamic fingerprints in Step S210 may be executed first, or alternatively, both thereof may be executed simultaneously.

[1-4-7-3. Content Recognition]

Next, based on a result of the similarity determination of the fingerprints, collator 130 performs the recognition of the video content (Step S220).

Collator 130 performs the recognition of the video content based on a result of the similarity determination between the static fingerprints, a result of the similarity determination between the dynamic fingerprints, and predetermined recognition conditions. As mentioned above, collator 130 collates each of a static fingerprint and a dynamic fingerprint, which are included in the fingerprint created in fingerprint creator 110, with the plurality of fingerprints, which are acquired from server device 20 by fingerprint acquirer 120. Then, based on a result of that collation and the predetermined recognition conditions, collator 130 selects one fingerprint from the plurality of fingerprints acquired in fingerprint acquirer 120, and outputs information, which corresponds to the selected fingerprint, as such a collation result.

The recognition conditions are conditions determined based on at least one of the static fingerprints and the dynamic fingerprints. An example of the recognition conditions is shown in FIG. 20. Note that the recognition conditions shown in FIG. 20 are conditions for use during a predetermined period. This predetermined period is a period of a predetermined number of frames. For example, the predetermined period is a period of 10 frames or less.

That is to say, collator 130 collates each of a static fingerprint and a dynamic fingerprint, which are created in fingerprint creator 110 during the predetermined period, with the static fingerprints and the dynamic fingerprints, which are acquired in fingerprint acquirer 120.

Note that the number of frames here stands for the number of image-changed frames. Hence, an actual period corresponds to a product obtained by multiplying the number of frames, which is determined as the predetermined period, by a coefficient that is based on an extraction frame rate set in video extractor 12 and on the frame rate of the content (for example, in the example shown in FIGS. 3, 4, the coefficient is "2" at 30 fps, is "3" at 20 fps, is "4" at 15 fps, and the like). Note that this number of frames may be defined as the number of image-changed frames, or may be defined as the number of fingerprints.

Note that, in the following description, "being similar" indicates that the determination of "being similar" is made in the above-mentioned similarity determination.

Recognition conditions (a) to (e) shown as an example in FIG. 20 are as follows.

(a) Similarity is established in at least one of the static fingerprints and the dynamic fingerprints.
(b) Similarity is established in at least two of the static fingerprints and the dynamic fingerprints.
(c) Similarity is established in at least one of the static fingerprints, and similarity is established in at least one of the dynamic fingerprints.
(d) Similarity is established continuously twice in the static fingerprints or the dynamic fingerprints.
(e) Similarity is established continuously three times in the static fingerprints or the dynamic fingerprints.

For example, in a case of performing the collation processing based on the recognition condition (a), collator 130 makes a determination as follows. In a case where the determination of "being similar" has been made for at least one of the static fingerprints and the dynamic fingerprints in the above-mentioned similarity determination, collator 130 determines that the video content has been recognized (Yes in Step S230). Otherwise, collator 130 determines that the video content has not been recognized (No in Step S230).

For example, if the predetermined period is set at 3 frames, collator 130 executes the following processing during a period of 3 frames of the image-changed frames. Collator 130 performs the above-mentioned similarity determination for the static fingerprints and the dynamic fingerprints, which are included in the fingerprints created in fingerprint creator 110. Then, if at least one of these is the fingerprint determined as "being similar", then collator 130 determines that the video content has been recognized. Then, collator 130 outputs information, which corresponds to the fingerprint, as a collation result.

Moreover, for example, in a case of performing the collation processing based on the recognition condition (b), collator 130 makes a determination as follows. In a case where the determination of "being similar" has been made for at least two of the static fingerprints and the dynamic fingerprints in the above-mentioned similarity determination, collator 130 determines that the video content has been recognized (Yes in Step S230). Otherwise, collator 130 determines that the video content has not been recognized (No in Step S230).

Note that this recognition condition (b) includes: a case where the determination of "being similar" is made for two or more of the static fingerprints; a case where the determination of "being similar" is made for two or more of the dynamic fingerprints; and a case where the determination of "being similar is made for one or more of the static fingerprints and the determination of "being similar is made for one or more of the dynamic fingerprints.

For example, if the predetermined period is set at 5 frames, collator 130 executes the following processing during a period of 5 frames of the image-changed frames. Collator 130 performs the above-mentioned similarity determination for the static fingerprints and the dynamic fingerprints, which are included in the fingerprints created in fingerprint creator 110. Then, if at least two of these are the fingerprint determined as "being similar", then collator 130 determines that the video content has been recognized. Then, collator 130 outputs information, which corresponds to the fingerprint, as a collation result.

Moreover, for example, in a case of performing the collation processing based on the recognition condition (c), collator 130 makes a determination as follows. In a case where the determination of "being similar" has been made for at least one of the static fingerprints and at least one of the dynamic fingerprints in the above-mentioned similarity determination, collator 130 determines that the video content has been recognized (Yes in Step S230). Otherwise, collator 130 determines that the video content has not been recognized (No in Step S230).

For example, if the predetermined period is set at 5 frames, collator 130 executes the following processing during a period of 5 frames of the image-changed frames. Collator 130 performs the above-mentioned similarity determination for the static fingerprints and the dynamic fingerprints, which are included in the fingerprints created in fingerprint creator 110. Then, if at least one of the static fingerprints and at least one of the dynamic fingerprints are the fingerprints determined as "being similar", then collator 130 determines that the video content has been recognized. Then, collator 130 outputs information, which corresponds to the fingerprint, as a collation result.

Note that, to this recognition condition, a condition regarding an order of the static fingerprints and the dynamic fingerprint may be added in addition to the condition regarding the number of fingerprints determined as "being similar".

Moreover, for example, in a case of performing the collation processing based on the recognition condition (d), collator 130 makes a determination as follows. In a case where the determination of "being similar" has been made continuously twice for the static fingerprints or the dynamic fingerprints in the above-mentioned similarity determination, collator 130 determines that the video content has been recognized (Yes in Step S230). Otherwise, collator 130 determines that the video content has not been recognized (No in Step S230).

Note that this recognition condition (d) stands for as follows. The temporally continuous fingerprints created in fingerprint creator 110 are determined as "being similar" continuously twice or more. This includes: a case where the static fingerprints created continuously twice or more are determined as "being similar" continuously twice or more; a case where the dynamic fingerprints created continuously twice or more are determined as "being similar" continuously twice or more; and a case where the static fingerprints and the dynamic fingerprints, which are created continuously while being switched from each other, are determined as "being similar" continuously twice or more.

For example, if the predetermined period is set at 5 frames, collator 130 executes the following processing during a period of 5 frames of the image-changed frames. Collator 130 performs the above-mentioned similarity determination for the static fingerprints and the dynamic fingerprints, which are included in the fingerprints created by fingerprint creator 110. Then, if the static fingerprints or the dynamic fingerprints are the fingerprints determined as "being similar" continuously twice, then collator 130 determines that the video content has been recognized. Then, collator 130 outputs information, which corresponds to the fingerprints, as a recognition result.

Moreover, for example, in a case of performing the collation processing based on the recognition condition (e), collator 130 makes a determination as follows. In a case where the determination of "being similar" has been made continuously three times for the static fingerprints or the dynamic fingerprints in the above-mentioned similarity determination, collator 130 determines that the video content has been recognized (Yes in Step S230). Otherwise, collator 130 determines that the video content has not been recognized (No in Step S230).

Note that this recognition condition (e) stands for as follows. The temporally continuous fingerprints created in fingerprint creator 110 are determined as "being similar" continuously three times or more. This includes: a case where the static fingerprints created continuously three times or more are determined as "being similar" continuously three times or more; a case where the dynamic fingerprints created continuously three times or more are determined as "being similar" continuously three times or more; and a case where the static fingerprints and the dynamic fingerprints, which are created continuously while being switched from each other, are determined as "being similar" continuously three times or more.

For example, if the predetermined period is set at 8 frames, collator 130 executes the following processing during a period of 8 frames of the image-changed frames. Collator 130 performs the above-mentioned similarity determination for the static fingerprints and the dynamic fingerprints, which are included in the fingerprints created by fingerprint creator 110. Then, if the static fingerprints or the dynamic fingerprints are the fingerprints determined as "being similar" continuously three times, then collator 130 determines that the video content has been recognized. Then, collator 130 outputs information, which corresponds to the fingerprints, as a recognition result.

Note that, in the above-mentioned recognition conditions, accuracy of the collation (content recognition) can be enhanced by increasing the number of fingerprints determined as "being similar" or the number of fingerprints determined continuously as "being similar".

FIG. 21 schematically shows an example of operations of collator 130 in a case where collator 130 performs the collation processing based on the recognition condition (e). In this case, collator 130 defines, as the recognition condition, that the similarity is established continuously three times in the static fingerprints or the dynamic fingerprints.

For example, it is assumed that the fingerprints of content 00X acquired from fingerprint DB 22 of server device 20 are arrayed in order of static fingerprint A, dynamic fingerprint B, static fingerprint C, dynamic fingerprint D, static fingerprint E. Note that, in FIG. 21, the fingerprints are individually represented by "Static A", "Dynamic B", "Static C", "Dynamic D", "Static E".

At this time, it is assumed that the fingerprints created from the video content received by video receiver 11 are arrayed in order of static fingerprint A, dynamic fingerprint B and static fingerprint C. Note that, in FIG. 21, the fingerprints are individually represented by "Static A", "Dynamic B", "Static C".

In this example, in the above-mentioned similarity determination, collator 130 outputs the determination result of "being similar" for each of static fingerprint A, dynamic fingerprint B, static fingerprint C. That is to say, collator 130 determines as "being similar" continuously three times.

In such a way, collator 130 determines that the fingerprints of the video content received by video receiver 11 are similar to the fingerprints of content 00X acquired from server device 20. That is to say, collator 130 recognizes that the video content received by video receiver 11 is content 00X. Then, collator 130 outputs information indicating content 00X (that is, information corresponding to the fingerprints of content 00X) as a collation result.

When the video content can be recognized in collator 130, and the collation result is output from collator 130 (Yes in Step S230), output unit 140 outputs, a result of the image recognition, which is based on the collation result received from collator 130, to additional information acquirer 13 (Step S240). This result of the image recognition is information indicating the video content corresponding to one fingerprint among the plurality of fingerprints acquired from server device 20 by fingerprint acquirer 120, and is information indicating the video content corresponding to the fingerprint determined to be similar to the fingerprint of the video content received in video receiver 11. This information indicating the video content is, for example, a content ID; however, the present disclosure does not limit this information. The information may be any information as long as the video content can be specified thereby.

When the video content cannot be recognized in collator 130, and the collation result is not output from collator 130 (No in Step S230), the processing of reception device 10 returns to Step S1, and the series of processing on and after Step S1 is repeated.

[1-5. Effects and the Like]

As described above, in this exemplary embodiment, the recognition data creation device includes the image acquirer and the data creator. The image acquirer acquires a plurality of image frames included in a frame sequence that composes video content. Based on an inter-frame change in an image in the plurality of image frames acquired by the image acquirer, the data creator creates recognition data representing the video content, the recognition data to be used as a fingerprint in recognition of the video content.

Moreover, in this exemplary embodiment, the image recognition device includes the recognition data creation device, the acquirer and the collator. The acquirer acquires a plurality of pieces of recognition data which represent respective pieces of video content. The collator collates the recognition data created in the data creator with the plurality of pieces of recognition data acquired by the acquirer.

Note that fingerprint creator 110 is an example of the recognition data creation device. Image acquirer 111 is an example of the image acquirer. The fingerprint is an example of the recognition data. Data creator 112 is an example of the data creator. Image recognizer 100 is an example of the image recognition device. Fingerprint acquirer 120 is an example of the acquirer. Collator 130 is an example of the collator.

By this configuration, the recognition data (fingerprint) is created based on the change in the image between the image frames, and accordingly, the processing relating to the image recognition can be reduced while enhancing the accuracy of the image recognition. For example, the inter-frame change in the image is detectable by processing with a relatively light load, such as calculation of the difference or the like. Meanwhile, in the conventional technology, processing with a relatively heavy load, such as outline sensing or the like, is required for the collation of the image frames, and the like. Hence, in accordance with the present disclosure, the fingerprint can be created while reducing the processing in comparison with the conventional technology.

In the recognition data creation device, the data creator may create the recognition data including at least one of the static fingerprint and a dynamic fingerprint, the static fingerprint based on the static region in which the inter-frame image variation is smaller than the first threshold, the dynamic fingerprint based on the dynamic region in which the inter-frame image variation is larger than the second threshold.

For example, the static region is a region occupied by a background, a subject with small motion and change and the like in the image frames. That is to say, in the continuous image frames, the motion and change of the subject in the static region are relatively small. Hence, the image recognition is performed while specifying the static region, thus making it possible to enhance the accuracy of the image recognition. The dynamic region is a region where there occurs a relatively large change in the image, which is generated in the scene switching and the like. That is to say, the dynamic region is a region where the characteristic change in the image occurs, and accordingly, the image recognition is performed while specifying the dynamic region, thus making it possible to enhance the accuracy of the image recognition. Moreover, the number of frames in each of which the dynamic region is generated is relatively small, and accordingly, the number of frames required for the image recognition can be reduced in comparison with the conventional case.

In the recognition data creation device, the data creator may include the difference calculator, the decision section, and creation section. The difference calculator may create the image-changed frame by calculating, as the pixel-changed value, the pixel-value difference between two temporally adjacent image frames among the plurality of image frames acquired by the image acquirer. The decision section may decide at least one of the static region in which the absolute value of the pixel-changed value in the image-changed frame is smaller than the first threshold, and the dynamic region in which the absolute value of the pixel-changed value in the image-changed frame is larger than the second threshold. The creation section may create at least one of the static fingerprint and the dynamic fingerprint based on at least one of the static region and the dynamic region which are decided by the decision section.

Note that difference calculator 220 is an example of the difference calculator. Decision section 230 is an example of the decision section. Creation section 240 is an example of the creation section.

In the recognition data creation device, the creation section may create the static fingerprint based on the static region in the case where the static region occupies the first ratio or more of the image-changed frame.

In such a way, it is possible to appropriately extract the background and the subject with small motion and change.

In the recognition data creation device, the creation section may create the static frame by filtering one of two image frames in the static region, and may define the created static frame as the static fingerprint.

In such a way, the brightness value of the region other than the static region in the image frame is set at "0" for example, whereby an amount of information of the static fingerprint can be reduced.

In the recognition data creation device, the creation section may create the dynamic fingerprint based on the dynamic region in the case where the dynamic region occupies the second ratio or more of the image-changed frame.

In such a way, it is possible to appropriately extract that there occurs a large change in an image such as the scene switching or the like.

In the recognition data creation device, the creation section may create the dynamic frame by filtering the image-changed frame in the dynamic region, and may define the created dynamic frame as the dynamic fingerprint.

In such a way, the brightness-changed value of the region other than the dynamic region in the image frame is set at "0" for example, whereby an amount of information of the dynamic fingerprint can be reduced.

In the image recognition device, the data creator may create the recognition data including at least two of one or more static fingerprints and one or more dynamic fingerprints, the one or more static fingerprints based on the static region in which the inter-frame image variation is smaller than the first threshold, the one or more dynamic fingerprints based on the dynamic region in which the inter-frame image variation is larger than the second threshold. The collator may collate each of the static fingerprint and the dynamic fingerprints which are included in the recognition data created in the data creator with the plurality of pieces of recognition data acquired by the acquirer, to select the recognition data similar to the static fingerprint or the dynamic fingerprint, and may output, as a collation result, the information which corresponds to the selected recognition data.

Note that data creator 112 is an example of the data creator.

In such a way, it is possible to appropriately extract the background and the subject with small motion and change. Moreover, it is possible to appropriately extract that there occurs a large change in an image such as the scene switching or the like.

In this image recognition device, the collator may select the recognition data which is similar to at least two of the static fingerprints and the dynamic fingerprints which are included in the recognition data created in the data creator, and may output, as the collation result, the information which corresponds to the selected recognition data.

In such a way, the image recognition can be performed by using at least two determination results of the static fingerprint and the dynamic fingerprint, and accordingly, the accuracy of the image recognition can be further enhanced.

Moreover, in this exemplary embodiment, the recognition data creation method includes: an image acquisition step of acquiring a plurality of image frames included in a frame sequence that composes video content; and a creation step of creating recognition data representing the video content, the recognition data to be used as a fingerprint in recognition of the video content, based on an inter-frame change in an image in the plurality of acquired image frames.

In such a way, the processing relating to the image recognition can be further reduced.

Note that these comprehensive or specific aspects may be realized by a system, a device, an integrated circuit, a computer program or a recording medium such as a computer-readable CD-ROM or the like, or may be realized by any combination of the system, the device, the integrated circuit, the computer program and the recording medium.

Other Exemplary Embodiments

As above, the first exemplary embodiment has been described as exemplification of the technology disclosed in this application. However, the technology in the present disclosure is not limited to this, and is applicable also to exemplary embodiments, which are appropriately subjected to alteration, replacement, addition, omission, and the like. Moreover, it is also possible to constitute new exemplary embodiments by combining the respective constituent elements, which are described in the foregoing first exemplary embodiment, with one another.

In this connection, another exemplary embodiment is exemplified below.

In the first exemplary embodiment, such a configuration example is shown, in which both of the static fingerprints and the dynamic fingerprints are used for the recognition of the video content; however, the present disclosure is never limited to this configuration. The recognition of the video content may be performed by using only either one of the static fingerprints and the dynamic fingerprints. For example, in the flowchart of FIG. 8, only either one of Step S110 and Step S120 may be performed. For example, fingerprint creator 110 may have a configuration including only either one of static region decision part 231 and dynamic region decision part 232. Moreover, for example, fingerprint creator 110 may have a configuration including only either one of static fingerprint creation part 241 and dynamic fingerprint creation part 242.

In the first exemplary embodiment, the description is made of the operation example of performing the image recognition for the advertisement content; however, the target of the image recognition is never limited to the advertisement content. The target of the image recognition performed in reception device 10 may be program content such as a drama, a variety show, and the like. In this case, reception device 10 can acquire information regarding, for example, a profile of a cast himself/herself, clothes worn by the cast, a place where the cast visits, and the like as the additional information, and can display those pieces of acquired information on the display screen while superimposing the same information on the video.

Server device 20 may create a fingerprint corresponding to video content such as program content or the like, which is other than the advertisement content. Fingerprint DB 22 may hold the fingerprint, which corresponds to the program content, in association with the content ID.

In the first exemplary embodiment, the respective constituent elements may be composed of dedicated hardware, or may be realized by executing software programs suitable for the respective constituent elements. The respective constituent elements may be realized in such a manner that a program executor as a CPU and a processor reads out and executes software programs recorded in a recording medium such as a hard disk, a semiconductor memory, and the like. Here, the software that realizes the reception device of the exemplary embodiment is a program such as follows.

That is to say, the program is a program for causing a computer to execute the recognition data creation method, the recognition data creation method including: an image acquisition step of acquiring a plurality of image frames included in a frame sequence that composes video content; and a creation step of creating recognition data representing the video content, the recognition data to be used as a fingerprint in recognition of the video content, based on an inter-frame change in an image in the plurality of acquired image frames.

Moreover, the above-described program may be distributed while being recorded in a recording medium. For example, the distributed program is installed in the devices or the like, and processors of the devices or the like are allowed to execute the program, thus making it possible to allow the devices or the like to perform the variety of processing.

Moreover, a part or whole of the constituent elements which compose the above-described respective devices may be composed of one system LSI (Large Scale Integration). The system LSI is a super multifunctional LSI manufactured by integrating a plurality of constituent parts on one chip, and specifically, is a computer system composed by including a microprocessor, a ROM, a RAM and the like. In the ROM, a computer program is stored. The microprocessor loads the computer program from the ROM onto the RAM, and performs an operation such as an arithmetic operation or the like in accordance with the loaded computer program, whereby the system LSI achieves a function thereof.

Moreover, a part or whole of the constituent elements which compose the above-described respective devices may be composed of an IC card detachable from each of the devices or of a single module. The IC card or the module is a computer system composed of a microprocessor, a ROM, a RAM and the like. The IC card or the module may include the above-described super multifunctional LSI. The microprocessor operates in accordance with the computer program, whereby the IC card or the module achieves a function thereof. This IC card or this module may have tamper resistance.

Moreover, the present disclosure may be realized by one in which the computer program or digital signals are recorded in a computer-readable recording medium, for example, a flexible disk, a hard disk, a CD-ROM, an MO, a DVD, a DVD-ROM, a DVD-RAM, a BD (Blu-Ray Disc (registered trademark)), a semiconductor memory and the like. Moreover, the present disclosure may be realized by digital signals recorded in these recording media.

Moreover, the computer program or the digital signals in the present disclosure may be transmitted via a telecommunications line, a wireless or wired communications line, a network such as the Internet or the like, a data broadcast, and the like.

Moreover, the present disclosure may be implemented by another independent computer system by recording the program or the digital signals in the recording medium and transferring the same, or by transferring the program or the digital signals via the network and the like.

Moreover, in the exemplary embodiment, the respective pieces of processing (respective functions) may be realized by being processed in a centralized manner by a single device (system), or alternatively, may be realized by being processed in a distributed manner by a plurality of devices.

As above, the exemplary embodiments have been described as the exemplification of the technology in the present disclosure. For this purpose, the accompanying drawings and the detailed description are provided.

Hence, the constituent elements described in the accompanying drawings and the detailed description can include not only constituent elements, which are essential for solving the problem, but also constituent elements, which are provided for exemplifying the above-described technology, and are not essential for solving the problem. Therefore, it should not be immediately recognized that such non-essential constituent elements are essential based on the fact that the non-essential constituent elements are described in the accompanying drawings and the detailed description.

Moreover, the above-mentioned exemplary embodiments are those for exemplifying the technology in the present disclosure, and accordingly, can be subjected to varieties of alterations, replacements, additions, omissions and the like within the scope of claims or within the scope of equivalents thereof.

INDUSTRIAL APPLICABILITY

The present disclosure is applicable to the recognition data creation device, the image recognition device and the recognition data creation method, which perform the recognition of the video content by using the communication network. Specifically, the present disclosure is applicable to a video reception device such as a television set or the like, or a server device or the like.

REFERENCE MARKS IN THE DRAWINGS 1 content recognition system
2 advertiser
3 broadcast station
4 STB
10 reception device
11 video receiver
11a video input unit
11b first external input unit
11c second external input unit
12 video extractor
13 additional information acquirer
14 video output unit
15 controller
16 operation signal receiver
17 HTTP transceiver
18 additional information storage
19 additional information display controller
20 server device
21 content receiver
22 fingerprint DB
30 advertisement server device
31 additional information DB
91, 92 frame
100 image recognizer
110 fingerprint creator
111 image acquirer
112 data creator
120 fingerprint acquirer
130 collator
140 output unit
210 scale converter
220 difference calculator
230 decision section
231 static region decision part
232 dynamic region decision part
240 creation section
241 static fingerprint creation part
242 dynamic fingerprint creation part

The invention claimed is:

1. An image recognition device comprising:
an image acquirer that acquires a plurality of image frames included in a frame sequence that composes video content; and
a data creator that creates recognition data representing the video content, the recognition data including at least one of a static fingerprint and a dynamic fingerprint, the static fingerprint being based on a static region in which an inter-frame image variation between the plurality of image frames acquired by the image acquirer is smaller than a first threshold, the dynamic fingerprint being based on a dynamic region in which the inter-frame image variation is larger than a second threshold,
wherein the data creator includes:
a static fingerprint creation part that creates a static frame by filtering one of two temporally adjacent image frames in the static region and defines the static frame as the static fingerprint; and a dynamic fingerprint creation part that creates a dynamic frame by filtering an image-changed frame in the dynamic region and defines the dynamic frame as the dynamic fingerprint,
wherein the image recognition device further comprises:
an acquirer that acquires a plurality of pieces of recognition data which represent respective pieces of video content: and
a collator that collates the recognition data created in the data creator with the plurality of pieces of recognition data acquired by the acquirer, wherein the data creator creates recognition data including at least one static fingerprint and at least one dynamic fingerprint, wherein the collator collates each of the static fingerprints and the dynamic fingerprints which are included in the recognition data created in the data creator with the plurality of pieces of recognition data acquired by the acquirer to select recognition data similar to the static fingerprint or the dynamic fingerprint, and output, as a collation result, information corresponding to the selected recognition data, and wherein the collator selects the recognition data similar to at least two of the static fingerprints and the dynamic fingerprints which are included in the recognition data created in the data creator, and outputs, as the collation result, information corresponding to the selected recognition data.

2. The image recognition device according to claim 1, wherein the data creator includes:
a difference calculator that creates the image-changed frame by calculating, as a pixel-changed value, a pixel-value difference between the two temporally adjacent image frames among the plurality of image frames acquired by the image acquirer;
a decision section that decides at least one of a static region in which an absolute value of the pixel-changed value in the image-changed frame is smaller than the first threshold and the dynamic region in which the absolute value of the pixel-changed value in the image-changed frame is larger than the second threshold; and
a creation section that creates at least one of the static fingerprint and the dynamic fingerprint based on at least one of the static region and the dynamic region which are decided by the decision section.

3. The image recognition device according to claim 2, wherein the creation section creates the static fingerprint based on the static region in a case where the static region occupies a first ratio or more of the image-changed frame.

4. The image recognition device according to claim 2, wherein the creation section creates the dynamic fingerprint based on the dynamic region in a case where the dynamic region occupies a second ratio or more of the image-changed frame.

5. An image recognition method comprising: a first acquisition step of acquiring a plurality of image frames included in a frame sequence that composes video content; and a creation step of creating recognition data representing the video content, the recognition data including at least one of a static fingerprint and a dynamic fingerprint, the static fingerprint being based on a static region in which an inter-frame image variation between the plurality of image frames is smaller than a first threshold, the dynamic fingerprint being based on a dynamic region in which the inter-frame image variation is larger than a second threshold, wherein the creation step comprises:

creating a static frame by filtering one of two temporally adjacent image frames in the static region, and defining the static frame as the static fingerprint; and creating a dynamic frame by filtering an image-changed frame in the dynamic region, and defining the dynamic frame as the dynamic fingerprint, wherein the image recognition method further comprises:

a second acquisition step of acquiring a plurality of pieces of recognition data which represent respective pieces of video content; and a collating step of collating the recognition data created by the creation step with the plurality of pieces of recognition data acquired by the second acquisition step, wherein the creation step creates recognition data including at least one static fingerprint and at least one dynamic fingerprint, wherein the collating step collates each of the static fingerprints and the dynamic fingerprints which are included in the recognition data created in the creation step with the plurality of pieces of recognition data acquired by the second acquisition step to select recognition data similar to the static fingerprint or the dynamic fingerprint, and outputs, as a collation result, information corresponding to the selected recognition data, and wherein the collating step selects the recognition data similar to at least two of the static fingerprints and the dynamic fingerprints which are included in the recognition data created in the creation step, and outputs, as the collation result, information corresponding to the selected recognition data.

6. A non-transitory computer-readable recording medium storing a computer program for causing a computer to execute the image recognition method according to claim 5.

* * * * *